(12) United States Patent
Miyake et al.

(10) Patent No.: US 6,775,762 B1
(45) Date of Patent: Aug. 10, 2004

(54) PROCESSOR AND PROCESSOR SYSTEM

(75) Inventors: Hideo Miyake, Kawasaki (JP);
Atsuhiro Suga, Kawasaki (JP); Yasuki Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 593 days.

(21) Appl. No.: 09/657,349

(22) Filed: Sep. 7, 2000

(30) Foreign Application Priority Data

Oct. 15, 1999 (JP) .............................................. 11-294580

(51) Int. Cl.[7] .............................. G06F 9/38; G06F 9/40; G06F 9/54
(52) U.S. Cl. ........................ 712/219; 712/34; 712/215; 712/245
(58) Field of Search ........................... 712/235, 34, 35, 712/36, 216, 215, 245, 231, 219; 709/104, 102, 106, 108, 107, 208

(56) References Cited

U.S. PATENT DOCUMENTS

| | | | | |
|---|---|---|---|---|
| 4,949,241 A | * | 8/1990 | Iwasaki et al. ............. | 710/110 |
| 4,985,826 A | * | 1/1991 | Jonsson et al. .............. | 712/235 |
| 5,781,752 A | * | 7/1998 | Moshovos et al. ........... | 712/216 |
| 5,790,880 A | * | 8/1998 | Ireton ........................... | 712/36 |
| 6,327,648 B1 | * | 12/2001 | Hedayat et al. ................ | 712/35 |

* cited by examiner

*Primary Examiner*—Daniel H. Pan
(74) *Attorney, Agent, or Firm*—Staas & Halsey LLP

(57) ABSTRACT

The present invention provides a processor system having a main processor that efficiently executes coprocessor instructions, regardless of the type of each coprocessor to which the main processor is connected. When a coprocessor instruction to instruct execution by a coprocessor is supplied, the main processor determines whether or not the supplied coprocessor instruction has a possibility of having control dependency on a preceding coprocessor instruction being executed by a corresponding one of the coprocessor, in accordance with an instruction field corresponding to the supplied coprocessor instruction. If the supplied coprocessor instruction has the possibility of having the control dependency, the main processor issues the supplied coprocessor to the corresponding one of the processors only after the execution of the preceding coprocessor instruction is completed.

18 Claims, 28 Drawing Sheets

FIG. 3 PRIOR ART

| OP-CODE | OPERAND 1 | OPERAND 2 | · · · | OPERAND n |

FIG. 4 PRIOR ART

| OP-CODE | — | OPERAND 1 |

FIG. 7

| OP-CODE | OPERAND 1 | OPERAND 2 | · · · | OPERAND n | EXCEP |

FIG. 12

| OP-CODE | OPERAND 1 | OPERAND 2 |

PROCESSOR AND PROCESSOR SYSTEM

BACKGROUND OF THE INVENTION

1. Field of the Invention

The present invention generally relates to processors and processor systems, and, more particularly, to a processor that issues instructions to a coprocessor by a predetermined control method and a processor system that comprises such processor and coprocessor.

2. Description of the Related Art

FIG. 1 shows the structure of a conventional processor system. As shown in FIG. 1, the conventional processor system comprises a main processor 1, a memory 3 connected to the main processor 1, and coprocessors CPR0 to CPRn connected to the main processor 1. The main processor 1 comprises an instruction fetch unit 5 connected to the memory 3, an instruction execution unit 7 connected to the instruction fetch unit 5, a coprocessor designation register (CR) 11 connected to the instruction execution unit 7, a coprocessor instruction control unit 13 connected to the instruction fetch unit 5 and the CR 11, and a register 9 connected to the coprocessor instruction control unit 13 and the instruction execution unit 7.

FIG. 2 shows the structures of the coprocessor instruction control unit 13 and the instruction execution unit 7 shown in FIG. 1. The coprocessor instruction control unit 13 comprises an instruction register 100, a resource decision unit 102, a resource decoding unit 103, an exception decoding unit 104, an exception decision unit 106, an issuance control unit 109, a completion control unit 110, and a scoreboard 111. The instruction register 100 is connected to the instruction fetch unit 5, and the resource decoding unit 103 is connected to the instruction register 100. The resource decision unit 102 is connected to the resource decoding unit 103, and the exception decoding unit 104 is connected to the instruction register 100. The exception decision unit 106 is connected to the exception decoding unit 104, and the issuance control unit 109 is connected to the instruction register 100, the resource decision unit 102, and the exception decision unit 106. The issuance control unit 109 and the completion control unit 110 are connected to the coprocessors CPR0 to CPRn and the register 9. The scoreboard 111 is connected to the issuance control unit 109, the completion control unit 110, the resource decision unit 102, and the exception decision unit 106. The exception decision unit 106 and the issuance control unit 109 are connected to the CR 11.

The instruction execution unit 7 comprises a decoding unit 115, a write control unit 129, and an execution control unit 131. The decoding unit 115 is connected to the instruction fetch unit 5, and the write control unit 129 and the execution control unit 131 are connected to the register 9 and the decoding unit 115. The write control unit 129 is also connected to the CR 11.

In the processor system having the above structure, the instruction fetch unit 5 fetches an instruction from the memory 3. If a fetched instruction is to rewrite the coprocessor designation register 11, the instruction fetch unit 5 supplies the instruction to the instruction execution unit 7. If a fetched instruction is to a coprocessor instruction, the instruction fetch unit 5 supplies the instruction to the coprocessor instruction control unit 13. If a fetched instruction is other than the above two types of instruction, the instruction fetch unit 5 supplies the instruction to the instruction execution unit 7.

The instruction execution unit 7 executes a supplied instruction. If a supplies instruction is to rewrite the coprocessor designation register 11, the instruction execution unit 7 rewrites the CR 11 by the write control unit 129.

Meanwhile, the coprocessor instruction control unit 13 controls coprocessor instruction execution in the coprocessors CPR0 to CPRn by the issuance control unit 109, the completion control unit 110, and the scoreboard 111. The issuance control unit 109 controls the instruction issuance from the main processor 1 to the coprocessors CPR0 to CPRn. In a case where the resource decision unit 102 determines that a coprocessor instruction supplied from the instruction fetch unit 5 has no data dependency on a preceding coprocessor instruction, and the exception decision unit 106 determines that there is no control dependency due to processing exception, the issuance control unit 109 issues a coprocessor instruction as an issuance signal In (n is an integer of 0 or greater) to a designated coprocessor, and writes the information of the issuance of the issuance signal In in the scoreboard 111. The "data dependency" refers to a situation in which, depending on the execution result of a preceding coprocessor instruction, a following coprocessor instruction is executed.

The "control dependency due to processing exception" refers to a situation in which an operation cannot continue because of an overflow resulting from an arithmetic operation such as a division using 0 or a floating-point calculation.

In a case where the resource decision unit 102 determines that there is data dependency, the issuance control unit 109 waits until a preceding coprocessor instruction on which a current coprocessor instruction depends, and then issues the current coprocessor instruction as the issuance signal In to a coprocessor designated by the CR 11. After that, the issuance control unit 109 writes the information of the issuance of the issuance signal In to the scoreboard 111. The completion control unit 110 of the coprocessor instruction control unit 13 receives a coprocessor instruction execution completion signal Cn (n is an integer of 0 or greater) from the coprocessor that has issued the coprocessor instruction. In response to the coprocessor instruction execution completion signal Cn, the completion control unit 110 then deletes the issuance information of the issuance signal In in the scoreboard 111.

The coprocessor designation register (CR) 11 designates the number of a coprocessor CPRn (n is an integer of 0 or greater) to be operated. The memory 3 stores instructions including coprocessor instructions to be supplied to the main processor 1. The register 9 consists of a plurality of storage units.

FIG. 3 shows an example format of coprocessor instructions. An instruction code OP-CODE indicates a process to be executed by one of the coprocessors CPR0 to CPRn. Operands 1 to n indicate the numbers of the storage units in the register 9 that hold data to be supplied to the coprocessor, or the numbers of the storage units in the register 9 that hold execution results from the coprocessor.

FIG. 4 shows a format of an instruction to rewrite the CR 11. The operand 1 shown in FIG. 4 designates one of the storage units in the register 9 that holds a value written in the CR 11. Any desired information may be stored between the instruction code OP-CODE and the operand 1 in FIG. 4.

In a case where a supplied coprocessor instruction has no possibility of causing an exceptional process and has no data dependency on a preceding coprocessor instruction, the issuance control unit 109 of the coprocessor instruction control unit 13 issues the supplied coprocessor instruction and writes the issuance information in the scoreboard 111. In a case where a supplied coprocessor instruction has no possibility of causing an exceptional process but has data dependency on a preceding coprocessor instruction, the issuance control unit 109 waits until the execution of the preceding coprocessor instruction is completed, and then issues the supplied coprocessor instruction. After that, the issuance control unit 109 writes the issuance information in the scoreboard 111.

In a case where a supplied coprocessor instruction has a possibility of causing an exceptional process but has no data dependency on a preceding coprocessor, the issuance control unit 109 of the coprocessor instruction control unit 13 issues the supplied coprocessor instruction and writes the issuance information in the scoreboard 111. In a case where a supplied coprocessor instruction has a possibility of causing an exceptional process and data dependency on a preceding coprocessor instruction, the issuance control unit 109 waits until the execution of the preceding coprocessor instruction is completed. After that, the issuance control unit 109 issues the supplied coprocessor instruction and writes the issuance information in the scoreboard 111.

In the processor system having the above structure, speculative execution is generally carried out as a means to improve the instruction issuance performance. If the speculative execution is employed as an instruction issuance control method for coprocessors, it is necessary to accommodate data dependency and control dependency due to an exceptional process.

In the conventional processor system including coprocessors, however, the coprocessor instruction control unit 13 determines whether or not a coprocessor instruction supplied from the instruction fetch unit 5 will have control dependency due to an exceptional process in accordance with an instruction code contained in the supplied coprocessor instruction. Depending on the determination result, the coprocessor instruction control unit 13 issues the supplied coprocessor instruction. Since each coprocessor instruction corresponds to the coprocessors CPR0 to CPRn, the structure of the main processor 1, more particularly, the structure of the coprocessor instruction control unit 13 is varied with the type of the coprocessors CPR0 to CPRn connected to the main processor 1.

SUMMARY OF THE INVENTION

A general object of the present invention is to provide processors and processor systems in which the above disadvantages are eliminated.

A more specific object of the present invention is to provide a processor that efficiently executes coprocessor instructions, regardless of the types of a connected coprocessor and each coprocessor instruction, and a processor system that includes such a processor.

The above objects of the present invention are achieved by a processor connected to a coprocessor, comprising:
 a determination unit that determines whether or not a first coprocessor instruction to be executed by the coprocessor has a possibility of having control dependency on a second coprocessor instruction to be executed by the coprocessor before the first coprocessor instruction, in accordance with dependency possibility data corresponding to the first coprocessor instruction; and
 an issuance unit that issues the first coprocessor instruction to the coprocessor after the execution of the second coprocessor instruction is completed, when the first coprocessor instruction has the possibility of having the control dependency on the second coprocessor instruction.

In this processor, the control dependency of the first coprocessor instruction is judged based on the dependency possibility data, instead of an instruction code contained in the first coprocessor instruction. Accordingly, the structure of the processor can be determined, regardless of the type of the coprocessor.

The above objects of the present invention are also achieved by a processor connected to a coprocessor, comprising:
 a signal generator unit that generates a signal for indicating whether or not the coprocessor is executing a first coprocessor instruction; and
 an instruction execution unit that executes a processor execution instruction when the signal generated from the signal generator unit indicates that the coprocessor is executing the first coprocessor instruction.

The above objects of the present invention are also achieved by a processor system, comprising:
 a coprocessor; and
 a main processor connected to the coprocessor, which main processor determines whether or not a first coprocessor instruction to be executed by the coprocessor has a possibility of having control dependency on a second coprocessor instruction to be executed by the coprocessor before the first coprocessor instruction, in accordance with dependency possibility data corresponding to the first coprocessor instruction,
 wherein, when the first coprocessor instruction has the possibility of having the control dependency on the second coprocessor instruction, the main processor issues the first coprocessor instruction to the coprocessor after the execution of the second coprocessor instruction is completed.

In this processor system, the main processor judges the control dependency of the first coprocessor instruction, based on the dependency possibility data, instead of an instruction code contained in the first coprocessor instruction. Accordingly, the structure of the main processor can be determined, regardless of the type of the coprocessor.

The above objects of the present invention are also achieved by a processor system comprising:
 a coprocessor; and
 a main processor connected to the coprocessor,
 wherein the main processor includes:
  a signal generator unit that generates a signal for indicating whether or not the coprocessor is executing a first coprocessor instruction; and
  an instruction execution unit that executes a processor execution instruction when the signal generated from the signal generator unit indicates that the coprocessor is executing the first coprocessor instruction.

The above and other objects and features of the present invention will become more apparent from the following description taken in conjunction with the accompanying drawings.

BRIEF DESCRIPTION OF THE DRAWINGS

FIG. 3 shows an example format of a conventional coprocessor instruction;

FIG. 4 shows an example format of an instruction to rewrite a conventional coprocessor designation register;

FIG. 7 shows an instruction format of each coprocessor instruction in the first embodiment of the present invention;

FIG. 12 shows a format of an instruction to rewrite one of flags in the third embodiment of the present invention;

DESCRIPTION OF THE PREFERRED EMBODIMENTS

The following is a detailed description of embodiments of the present invention, with reference to the accompanying drawings.

First Embodiment

Figure 5:
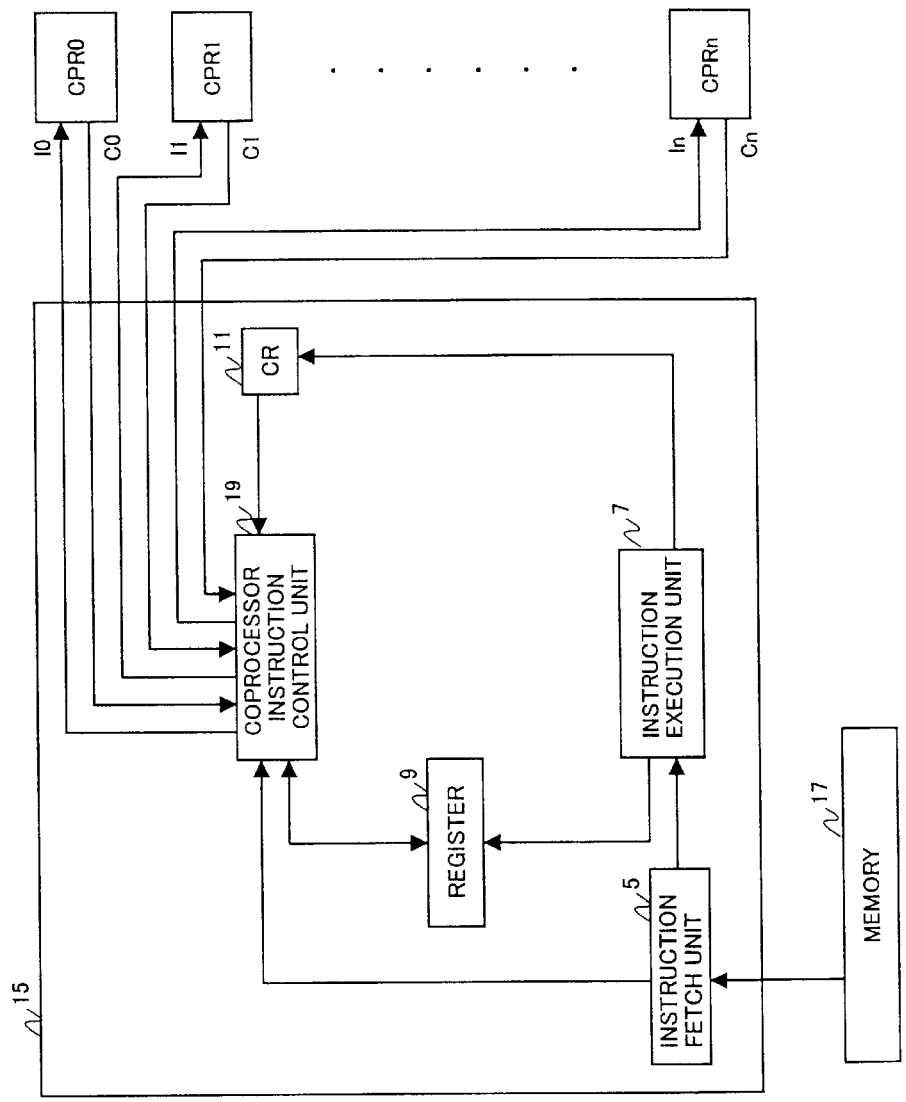
FIG. 5 shows the structure of a processor system in accordance with a first embodiment of the present invention.

FIG. 5 shows the structure of a processor system in accordance with a first embodiment of the present invention. As shown in FIG. 5, this processor system comprises a coprocessor instruction control unit 19 having a different structure from the coprocessor instruction control unit 13 of the conventional processor system shown in FIG. 1.

Figure 6:
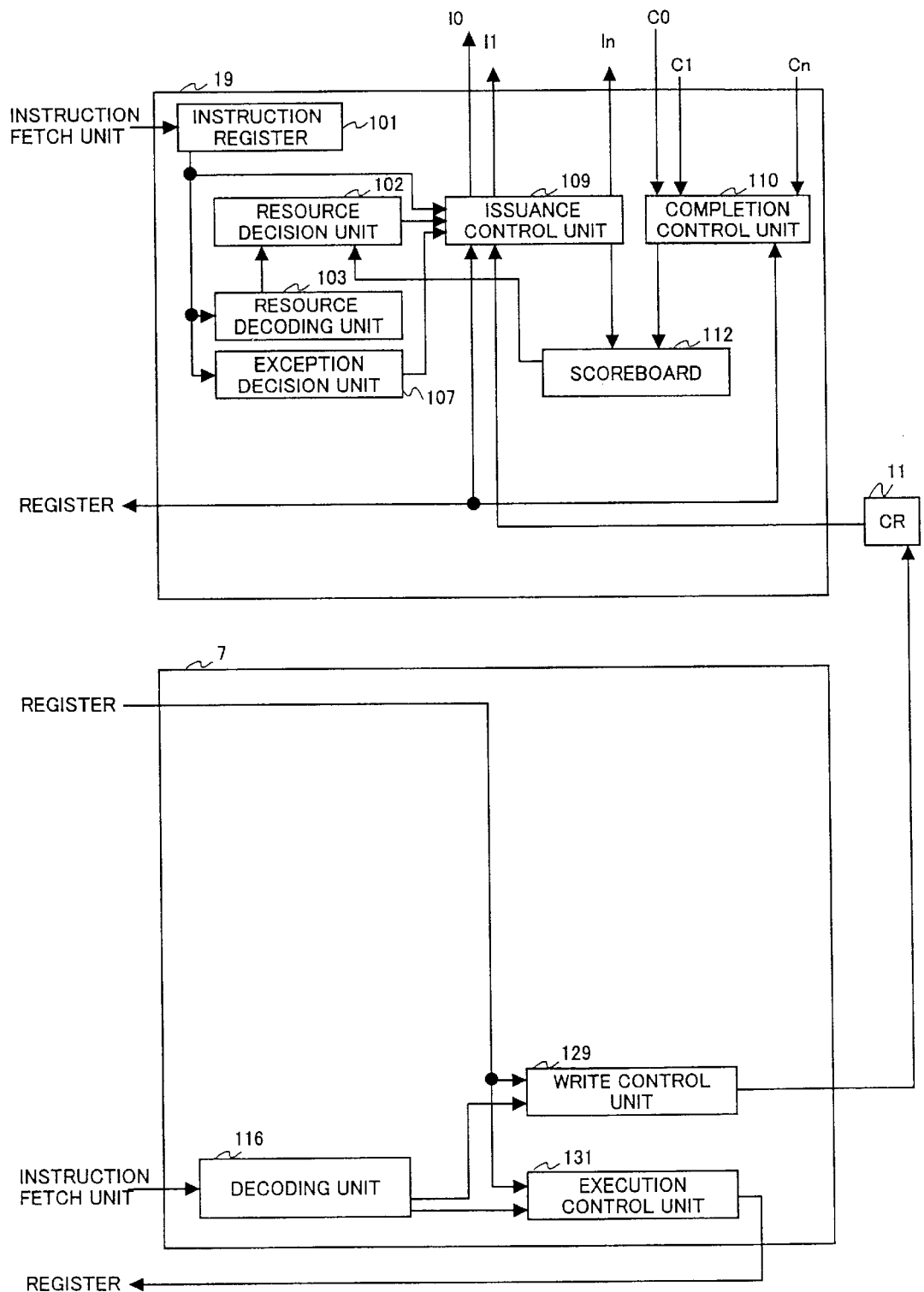
FIG. 6 shows the structures of a coprocessor instruction control unit and an instruction execution unit of the processor system of FIG. 5.

FIG. 6 shows the structures of the coprocessor instruction control unit 19 and an instruction execution unit 7 of the processor system shown in FIG. 5. The coprocessor instruction control unit 19 comprises an instruction register 101, a resource decision unit 102, a resource decoding unit 103, an exception decision unit 107, an issuance control unit 109, a completion control unit 110, and a scoreboard 112. The instruction register 101 is connected to the instruction fetch unit 5, and the resource decoding unit 103 is connected to the instruction register 101. The resource decision unit 102 is connected to the resource decoding unit 103. The exception decision unit 107 is connected to the instruction register 101, and the issuance control unit 109 is connected to the instruction register 101, the resource decision unit 102, and the exception decision unit 107. The issuance control unit 109 and the completion control unit 110 are both connected to the coprocessors CPR0 to CPRn and a register 9. The scoreboard 112 is connected to the issuance control unit 109, the completion control unit 110, and the resource decision unit 102. The issuance control unit 109 is also connected to a coprocessor designation register (CR) 11.

The instruction execution unit 7 comprises a decoding unit 116, a write control unit 129, and an execution control unit 131. The decoding unit 116 is connected to the instruction fetch unit 5, and the write control unit 129 and the execution control unit 131 are connected to the register 9 and the decoding unit 116. The write control unit 129 is also connected to the CR 11.

Figure 7:
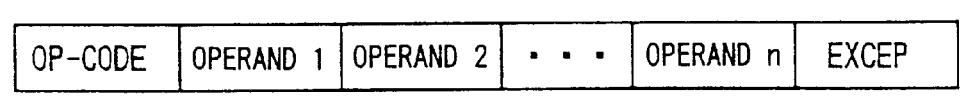

The memory 17 of this embodiment stores in advance coprocessor instructions having a format shown in FIG. 7. The coprocessor instruction format shown in FIG. 7 is different from the coprocessor instruction format shown in FIG. 3 in that a field EXCEP that indicates whether or not the coprocessor instruction has a possibility of having control dependency due to an exceptional process is attached to the operand n. If the coprocessor instruction has a possibility of having control dependency due to an exceptional process, "1" is written in the field EXCEP. If the coprocessor instruction has no possibility of having control dependency, "0" is written in advance in the field EXCEP. The "control dependency due to an exceptional process" refers to a situation in which an operation cannot continue because of an overflow resulting from an arithmetic operation such as a division using 0 or a floating-point calculation.

The operation of the coprocessor instruction control unit 10 will now be described by way of an example in which a coprocessor instruction having the above-described format is supplied to the instruction register 101 via the instruction fetch unit 5. The coprocessor instruction supplied to the instruction register 101 is analyzed by the resource decoding unit 103. Based on the analysis and the issuance information corresponding to an instruction in execution supplied from the scoreboard 112, the resource decision unit 102 determines whether or not the coprocessor instruction supplied from the instruction fetch unit 5 has data dependency on a preceding coprocessor instruction to be executed. The determination result is reported to the issuance control unit 109.

In a case where the exception decision unit 107 determines that the value written in the field EXCEP in the supplied coprocessor instruction is "0", and the resource decision unit 102 determines that the supplied coprocessor instruction has no data dependency on the preceding coprocessor instruction to be executed, the issuance control unit 109 issues the supplied coprocessor instruction in the form of the issuance signal In to a coprocessor designated by the CR 11. After that, the issuance control unit 109 writes the issuance information in the scoreboard 112. On the other hand, in a case where the resource decision unit 102 determines that the supplied coprocessor instruction has data dependency on the preceding coprocessor instruction to be executed, the issuance control unit 109 waits until the execution of the preceding coprocessor instruction is completed. After that, the issuance control unit 109 issues the supplied coprocessor instruction in the form of the issuance signal In to the coprocessor designated by the CR 11, and then writes the issuance information in the scoreboard 112.

In a case where the field EXCEP in a supplied coprocessor instruction is "1", the issuance control unit 109 invariably waits until the execution of a preceding coprocessor instruction is completed, and then issues the supplied coprocessor instruction in the form of the issuance signal In to a coprocessor designated by the CR 11. After that, the issuance control unit 109 writes the issuance information in the scoreboard 112.

Figure 2:
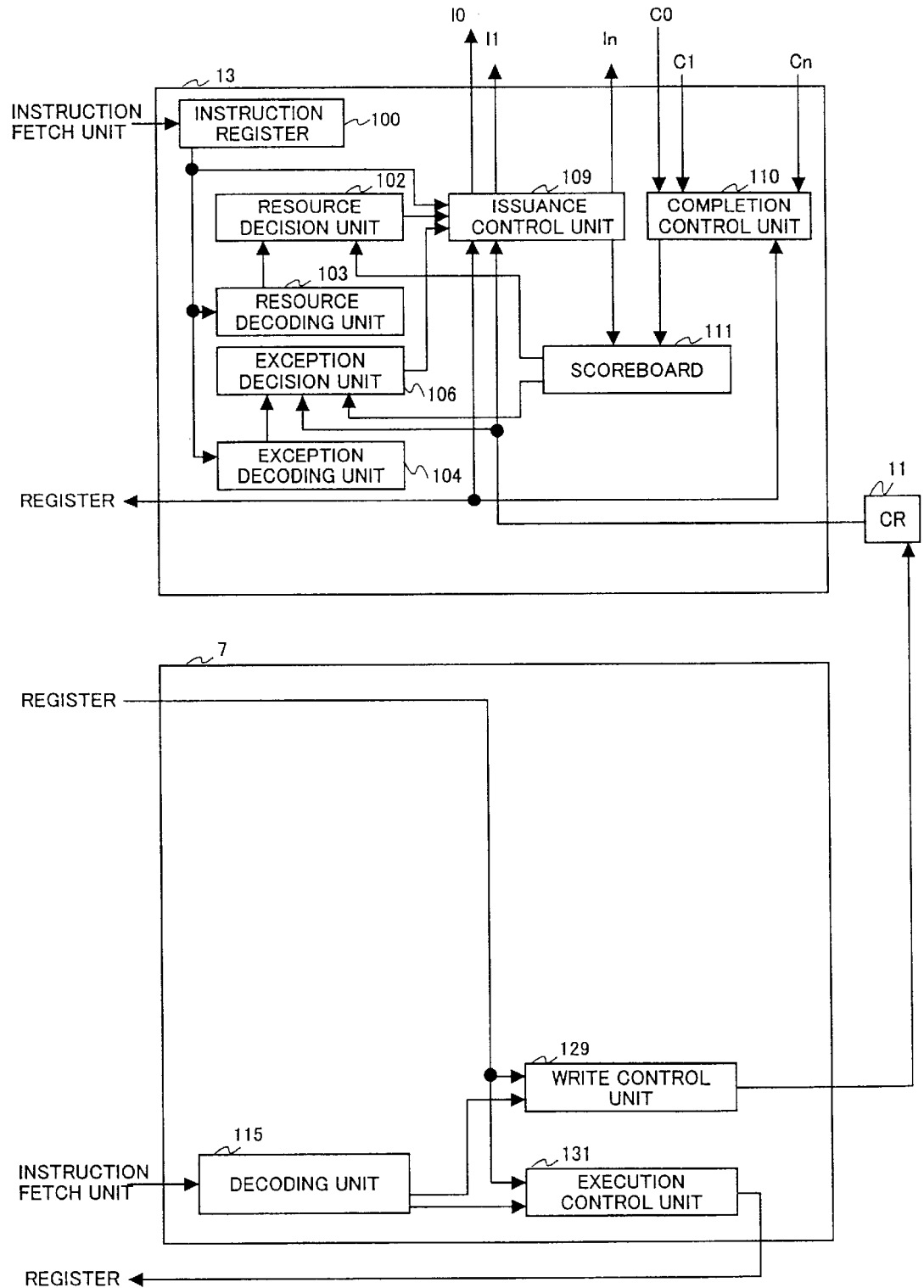
FIG. 2 shows the structures of a coprocessor instruction control unit and an instruction execution unit of the processor system of FIG. 1.

In the coprocessor instruction control unit 19 of this embodiment, the issuance timing is determined by the information written in the field EXCEP in a supplied coprocessor instruction, instead of the information of a preceding coprocessor instruction to be executed. Accordingly, the wiring from elements such as the scoreboard 112 to the exception decision unit 10 is not required, and the exception decoding unit 104 shown in FIG. 2 can be omitted.

By the above processor system of the first embodiment, the circuit size can be reduced, and the main processor 15 determines the timing of issuing a coprocessor instruction in accordance with the information written in the field EXCEP affixed to the operand n, instead of an instruction code contained in each supplied coprocessor instruction. Thus, an efficient instruction issuance operation can be performed, regardless of the type of coprocessor instruction supplied from the memory 17.

Second Embodiment

Figure 8:
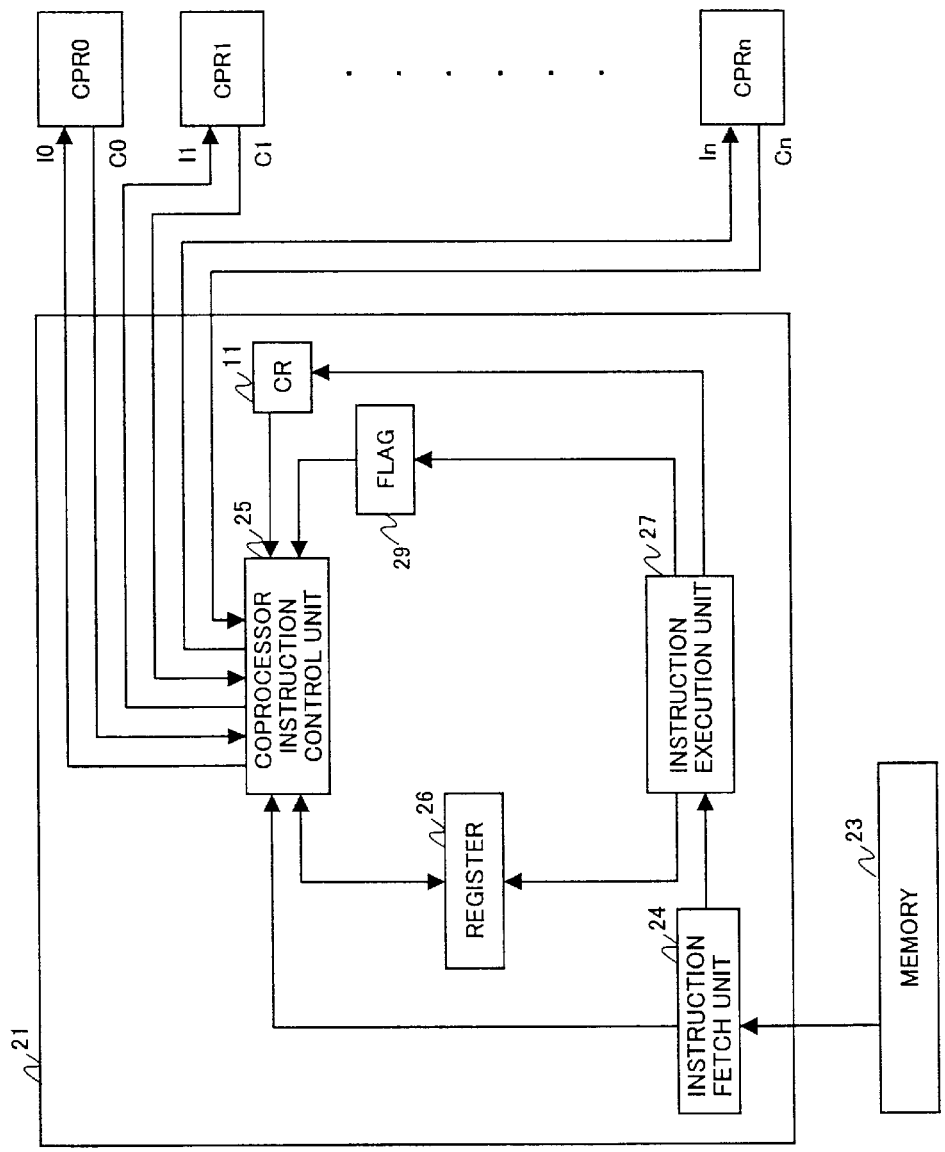
FIG. 8 shows the structure of a processor system in accordance with a second embodiment of the present invention.

FIG. 8 shows the structure of a processor system in accordance with a second embodiment of the present invention. As shown in FIG. 8, this processor system is different from the conventional processor system shown in FIG. 1, in the structures of an instruction fetch unit 24, a coprocessor instruction control unit 25, and an instruction execution unit 27 included in a main processor 21. The main processor 21 further includes a flag 29 connected to the instruction execution unit 27.

Figure 9:
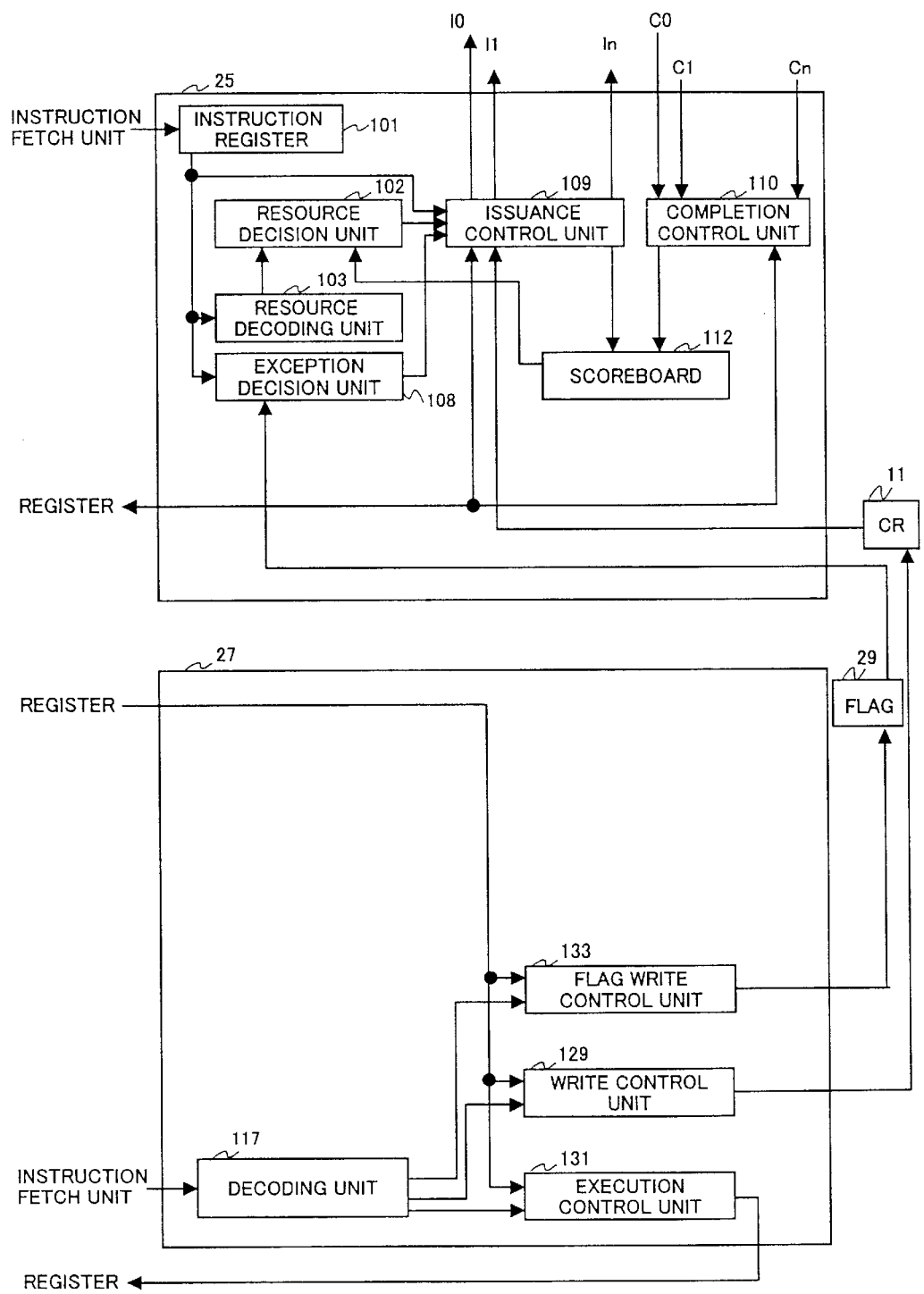
FIG. 9 shows the structures of a coprocessor instruction control unit and an instruction execution unit of the processor system of FIG. 8.

FIG. 9 shows the structures of the coprocessor instruction control unit 25 and the instruction execution unit 27 of the processor system of FIG. 8. As shown in FIG. 9, the coprocessor instruction control unit 25 and the instruction execution unit 27 have the same structures respectively as the coprocessor instruction control unit 19 and the instruction execution unit 7 shown in FIG. 6, except that the coprocessor instruction control unit 25 comprises an exception decision unit 108 connected to the flag 29 and the instruction execution unit 27 further comprises a flag write control unit 133 that is connected to a decoding unit 117 and a register 26 and controls writing in the flag 29.

Figure 1:
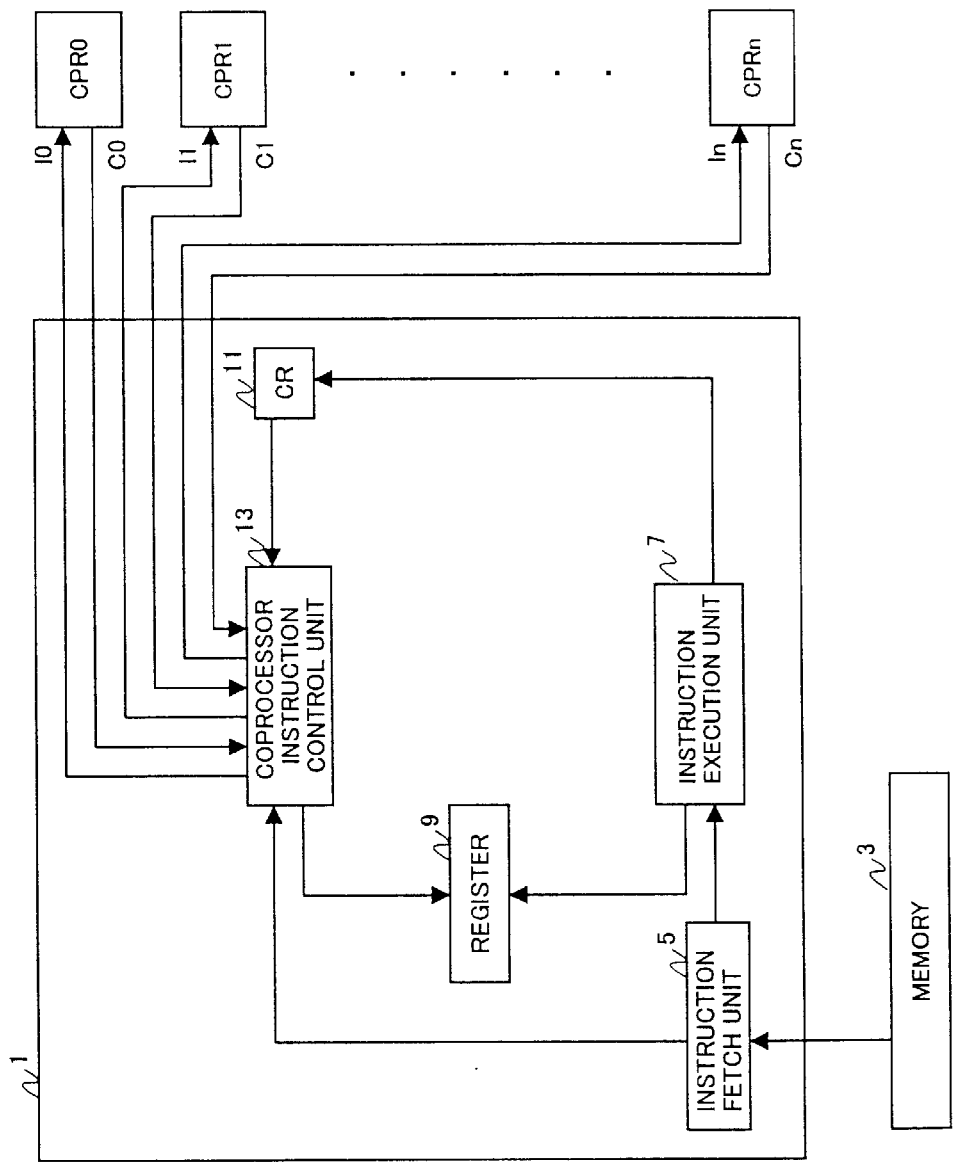
FIG. 1 shows the structure of a conventional processor system.

In the following, the different aspects from the conventional processor system shown in FIG. 1 will be described in greater detail.

A memory 23 of this embodiment stores an instruction to update the flag 29 in advance. Such an instruction has the same format as the format shown in FIG. 4. In this case, the number of a storage unit in the register 26 that holds a write value (0 or 1) for the flag 29 is written in the operand 1 shown in FIG. 4. If the instruction fetch unit 29 fetched the above instruction to rewrite the value of the flag 29, the fetched instruction is supplied to the instruction execution unit 27. Upon receipt of that instruction, et flag write control unit 133 contained in the instruction execution unit 27 rewrites the value of the flag 29.

The flag 29 connected to the instruction execution unit 27 indicates the issuance of a coprocessor instruction that has a possibility of having control dependency due to an exceptional process from the main processor 21 to the coprocessors CPR0 to CPRn. In a case where the coprocessor instruction that has a possibility of having control dependency due to an exceptional process is issued, the flag write control unit 133 contained in the instruction execution unit sets "1" in the flag 29 in advance. In a case where the coprocessor instruction that has a possibility of having control dependency due to an exceptional process is not issued, the flag write control unit 133 contained in the instruction execution unit 27 sets the flag 29 at "0" in advance.

If the exception decision unit 108 determines that the flag 29 is "0" when a supplied coprocessor instruction is issued, the coprocessor instruction control unit 25 operates as follows. In a case where the coprocessor instruction supplied from the instruction fetch unit 24 has no data dependency on a preceding coprocessor instruction to be executed, the issuance control unit 109 issues a coprocessor instruction as the issuance signal In to a coprocessor designated by the CR 11, and then writes the issuance information in the scoreboard 112. On the other hand, in a case where the coprocessor instruction supplied from the instruction fetch unit 24 has data dependency on a preceding coprocessor instruction to be executed, the issuance control unit 109 waits until the execution of the preceding coprocessor instruction is completed. After that, the issuance control unit 109 issues the supplied coprocessor instruction as the issuance signal In to a coprocessor designated by the CR 11, and then writes the issuance information in the scoreboard 112.

If the exception decision unit 108 determines that the flag 29 is "1" when a supplied coprocessor instruction is issued, the issuance control unit 109 always waits until the execution of a preceding coprocessor instruction is completed, and then issues the supplied coprocessor instruction as the issuance signal In to a coprocessor designated by the CR 11. After that, the issuance control unit 109 writes the issuance information into the scoreboard 112.

In the above processor system of the second embodiment, the main processor 21 determines the issuance timing of coprocessor instructions in accordance with the value of the flag 29, instead of an instruction code contained in each supplied coprocessor instruction. Thus, an efficient instruction issuance operation can be performed, regardless of the type of coprocessor instruction supplied from the memory 23.

Third Embodiment

Figure 10:
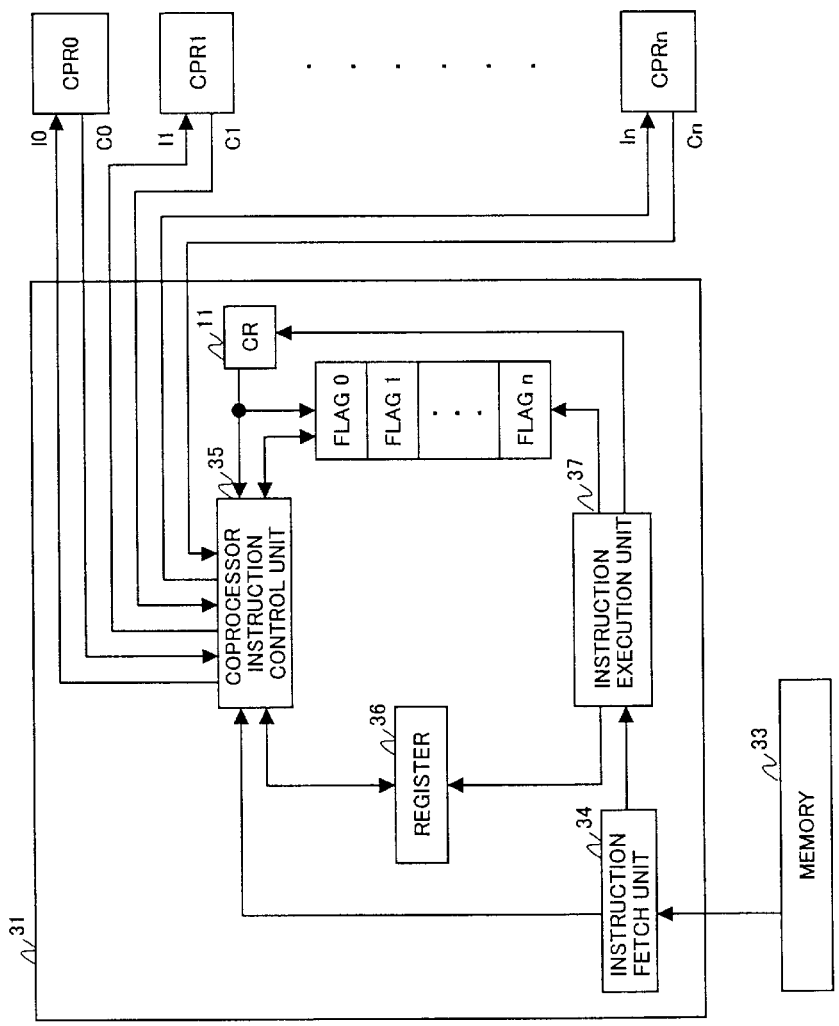
FIG. 10 shows the structure of a processor system in accordance with a third embodiment of the present invention.

FIG. 10 shows the structure of a processor system in accordance with a third embodiment of the present invention. As shown in FIG. 10, this processor system has the same structure as the processor system in accordance with the second embodiment shown in FIG. 8, except for the structures of an instruction fetch unit 34, a coprocessor instruction control unit 35, and an instruction execution unit 37 contained in a main processor 31. The main processor 31 further includes n of flags that are connected to the instruction execution unit 37 and correspond to the respective coprocessors CPR0 to CPRn.

Figure 11:
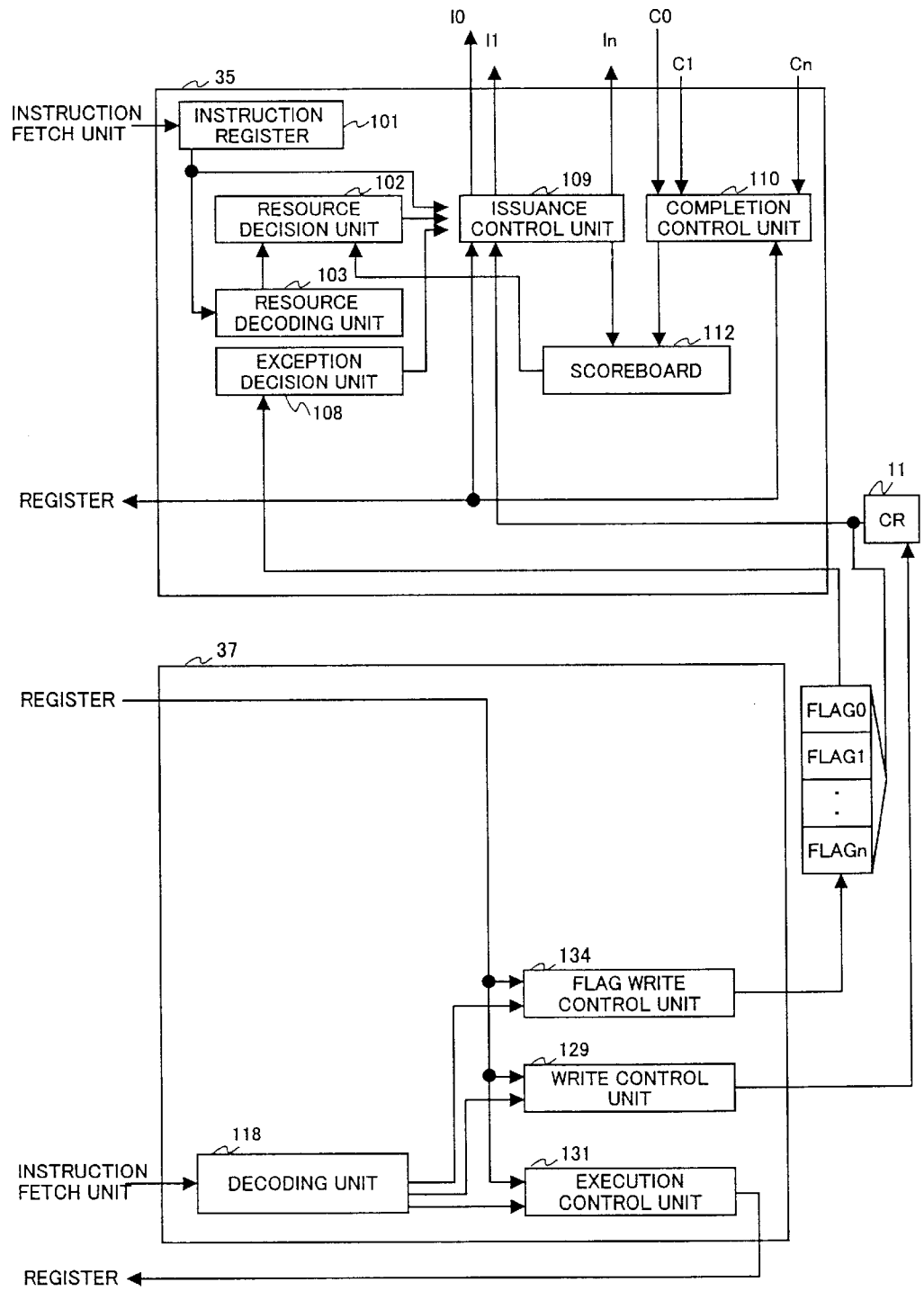
FIG. 11 shows the structures of a coprocessor instruction control unit and an instruction execution unit of the processor system of FIG. 10.

FIG. 11 shows the structures of a coprocessor instruction control unit 35 and an instruction execution unit 37 of the processor system shown in FIG. 10. The coprocessor instruction control unit 35 and the instruction execution unit 37 have the same structures respectively as the coprocessor instruction control unit 25 and the instruction execution unit 27 shown in FIG. 9, except that the exception decision unit 108 in the coprocessor instruction control unit 35 is connected to the flags 0 to n, and that the instruction execution unit 37 includes a flag write control unit 134 that is connected to a decoding unit 118 and a register 36 and controls writing in the flags 0 to n.

In the following, the different aspects from the processor system of the second embodiment shown in FIG. 8 will be described in greater detail.

An instruction that has a format shown in FIG. 12 to rewrite at least one of the flags 0 to n is stored in a memory 33 in advance. A number that designates a flag into which a value "0" or "1" is written is stored in the operand 1, and a number that indicates the storage unit in the register 36 holding the value "0" or "1" in the flag designated by the operand 1 is stored in the operand 2. When the instruction fetch unit 34 fetches the instruction to rewrite a designated flag, the instruction is supplied to the instruction execution unit 37. The flag write control unit 134 receives the instruction, and writes the value stored in the storage unit in the register 36 designated by the operand 2 of the instruction into the flag designated by the operand 1.

The n of flags connected to the instruction execution unit 37 each indicate the issuance of a coprocessor instruction, which has a possibility of causing control dependency due to an exceptional process, from the main processor 31 to each corresponding one of the coprocessors CPR0 to CPRn. In a case where a coprocessor instruction that has a possibility of causing control dependency due to an exceptional process is issued, the flag write control unit 134 of the instruction execution unit 37 sets "1" in the designated flag. In a case where a coprocessor instruction that has no possibility of causing control dependency due to an exceptional process is issued, the flag write control unit 134 sets "0" in advance in the designated flag.

If the exception decision unit 108 determines that the flag corresponding to the coprocessor to execute a coprocessor instruction supplied from the instruction fetch unit 34 is "0", the coprocessor instruction control unit 35 operates as follows. In a case where the supplied coprocessor instruction has no data dependency on a preceding coprocessor instruction being executed by the coprocessor, the issuance control unit 109 issues the supplied coprocessor instruction as the issuance signal In to the coprocessor designated by the CR 11, and then writes the issuance information in the scoreboard 112. In a case where the supplied coprocessor instruction has data dependency on the preceding coprocessor instruction being executed by the coprocessor, the issuance control unit 109 waits until the execution of the preceding coprocessor instruction is completed. After that, the issuance control unit 109 issues the supplied coprocessor instruction as the issuance signal In to the coprocessor designated by the CR 11, and writes the issuance information into the scoreboard 112.

If the exception decision unit 108 determines that the flag corresponding to the coprocessor to execute the supplied coprocessor instruction, the issuance control unit 109 invariably waits for the execution of the preceding coprocessor instruction is completed. After that, the issuance control unit 109 issues the supplied coprocessor instruction as the issuance signal In to the coprocessor, and writes the issuance information into the scoreboard 112.

By the above processor system of the third embodiment, the same effects as obtained by the processor system of the second embodiment can be obtained. Furthermore, since the main processor 31 determines whether or not each coprocessor instruction to be executed has control dependency for each of the coprocessors CPR0 to CPRn, each coprocessor instruction to be executed by one of the coprocessors CPR0 to CPRn can be issued without writing for the issuance of a coprocessor instruction to be executed by another one of the coprocessors CPR0 to CPRn. Thus, an efficient issuance of coprocessor instruction to the coprocessors CPR0 to CPRn can be carried out.

Fourth Embodiment

Figure 13:
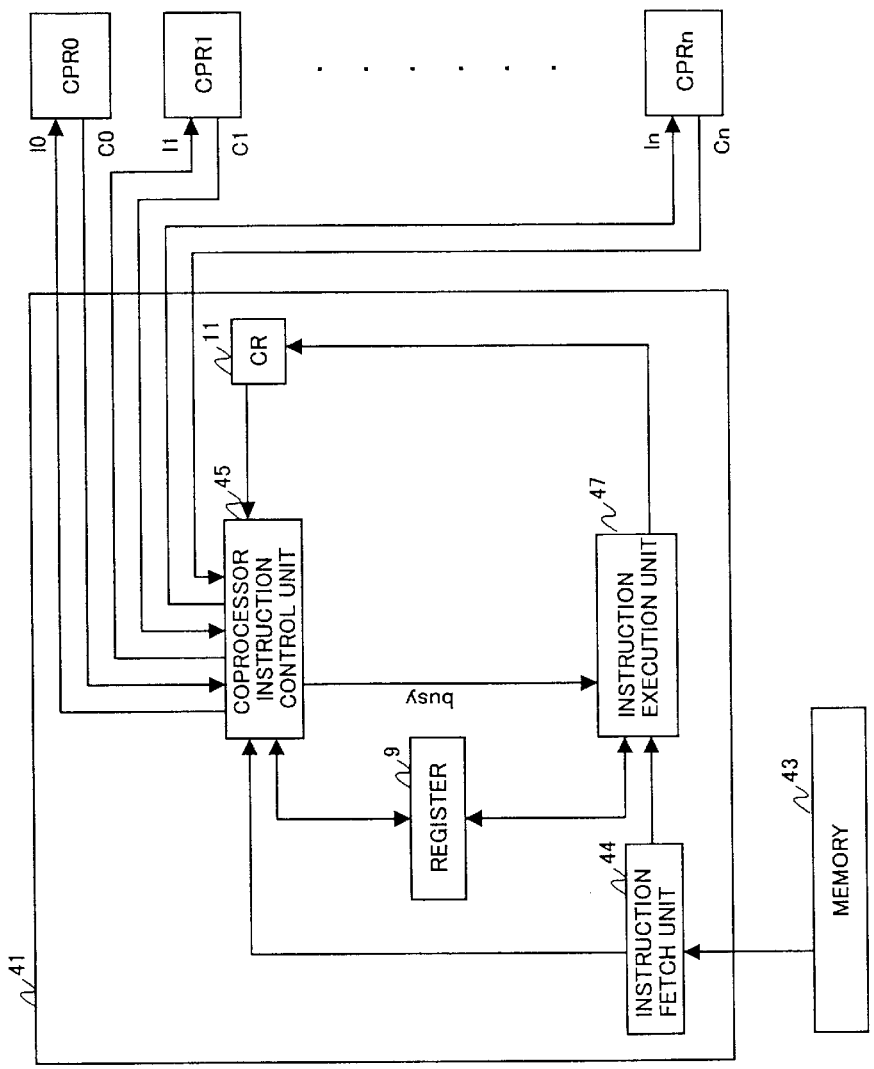
FIG. 13 shows the structure of a processor system in accordance with a fourth embodiment of the present invention.

FIG. 13 shows the structure of a processor system in accordance with a fourth embodiment of the present invention. As shown in FIG. 13, this processor system has the same structure as the processor system of the first embodiment shown in FIG. 5, except for the structures of an instruction fetch unit 44, a coprocessor instruction control unit 45, and an instruction execution unit 47 contained in a main processor 41.

Figure 14:
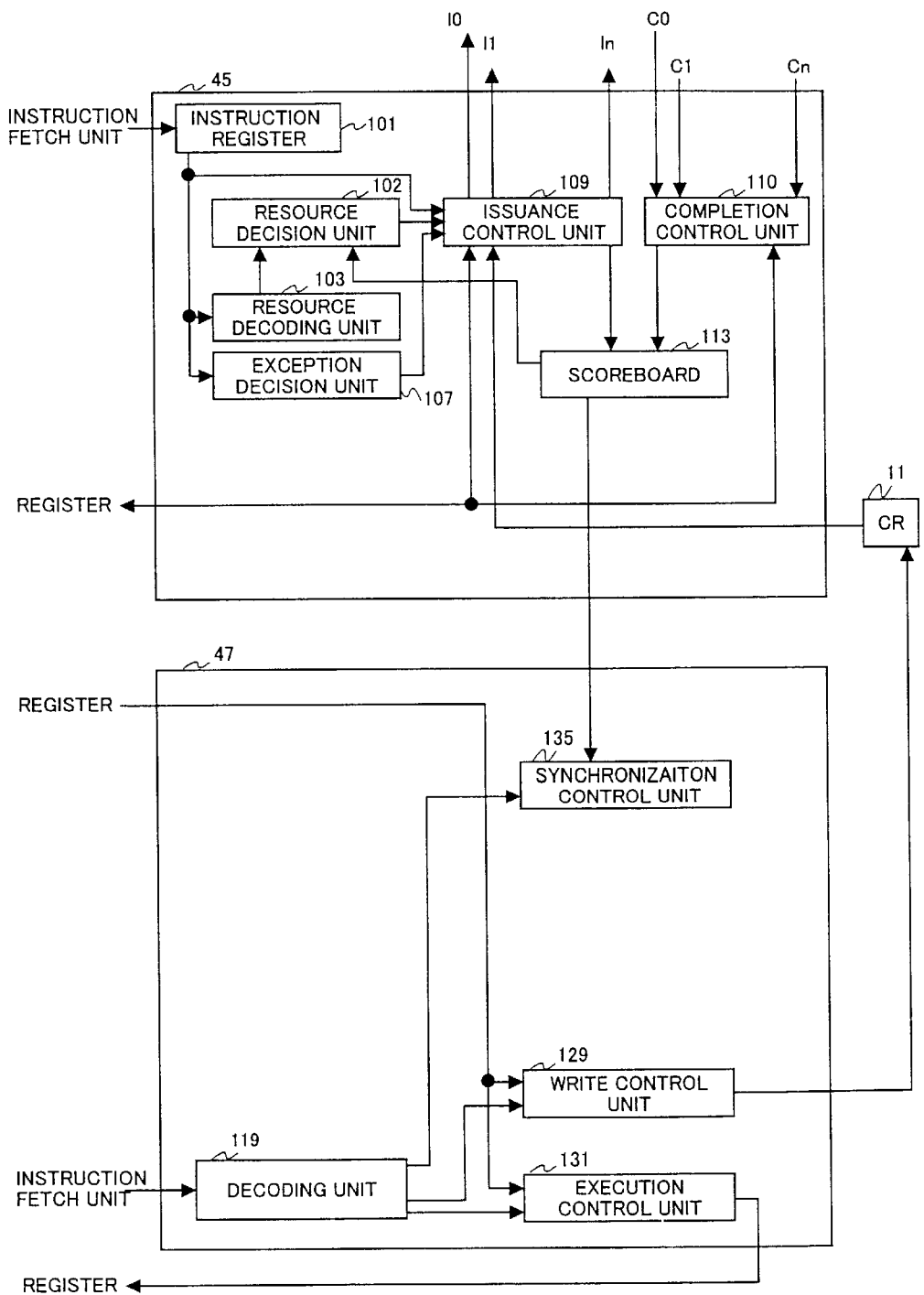
FIG. 14 shows the structures of a coprocessor instruction control unit and an instruction execution unit of the processor system of FIG. 13.

FIG. 14 shows the structures of a coprocessor instruction control unit 45 and an instruction execution unit 47 of the processor system shown in FIG. 13. The coprocessor instruction control unit 45 and the instruction execution unit 47 have the same structures respectively as the coprocessor instruction control unit 19 and the instruction execution unit 7 shown in FIG. 6, except that the instruction execution unit 47 further comprises a synchronization control unit 135 connected to a decoding unit 119, and that the coprocessor instruction control unit 45 comprises a scoreboard 113 connected to the synchronization control unit 135.

In the following, the different aspects from the processor system of the first embodiment shown in FIG. 5 will be described in greater detail.

Figure 15:
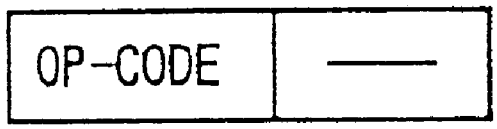
FIG. 15 shows a format of an instruction to wait until the execution of a coprocessor instruction being currently executed is completed.

First, an instruction to wait for the completion of the execution of a coprocessor instruction being currently executed is stored in advance in the memory 43. This instruction has a format shown in FIG. 15. When the instruction fetch unit 44 fetches the instruction to wait for the completion of the execution of a coprocessor instruction being currently executed, the instruction is supplied to the instruction execution unit 47. If a signal BUSY having the value "0" has been already supplied from the scoreboard 113 of the coprocessor instruction control unit 45 at this point, the synchronization control unit 135 of the instruction execution unit 47 executes a next processor execution instruction. On the other hand, if a signal BUSY having the value "1" has been supplied from the scoreboard 113 of the coprocessor instruction control unit 45 at the time of the reception of the instruction, the synchronization control unit of the instruction execution unit 47 executes the processor execution instruction when the signal BUSY turns "0", and ends the operation.

In a case where any of the coprocessors CPR0 to CPRn is executing a coprocessor instruction, the scoreboard 113 of the coprocessor instruction control unit 45 supplies the signal BUSY having the value "1" to the synchronization control unit 135 of the instruction execution unit 47. In a case where none of the coprocessors CPR0 to CPRn is executing a coprocessor instruction, the scoreboard 113 of the coprocessor instruction control unit 45 supplies the signal BUSY having the value "0" to the synchronization control unit 135 of the instruction execution unit 47.

By the above processor system of the fourth embodiment, the main processor 41 can execute each processor execution instruction and determine the issuance timing of each coprocessor instruction in accordance with the signal BUSY, instead of the instruction code contained in each supplied coprocessor instruction. Thus, an efficient instruction issuance operation can be performed, regardless of the type of each coprocessor instruction supplied from the memory 43.

Fifth Embodiment

Figure 16:
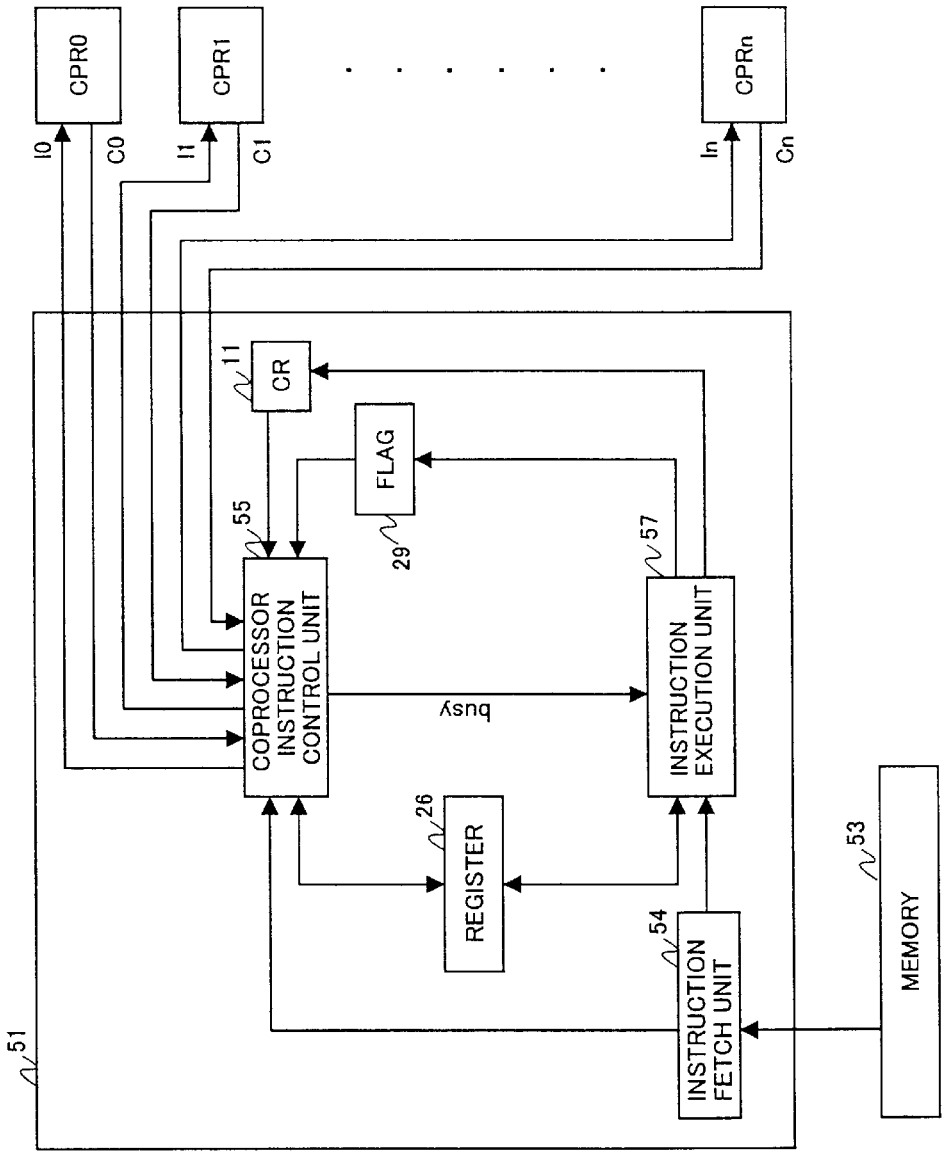
FIG. 16 shows the structure of a processor system in accordance with a fifth embodiment of the present invention.

FIG. 16 shows the structure of a processor system in accordance with a fifth embodiment of the present invention. As shown in FIG. 16, this processor system has the same structure as the processor system of the fourth embodiment shown in FIG. 13, except for the structures of an instruction fetch unit 54, a coprocessor instruction control unit 55, and an instruction execution unit 57 included in a main processor 51, and the flag 29 also included in the main processor 51. This flag 29 is the same as the flag 29 of the second embodiment shown in FIG. 8.

Figure 17:
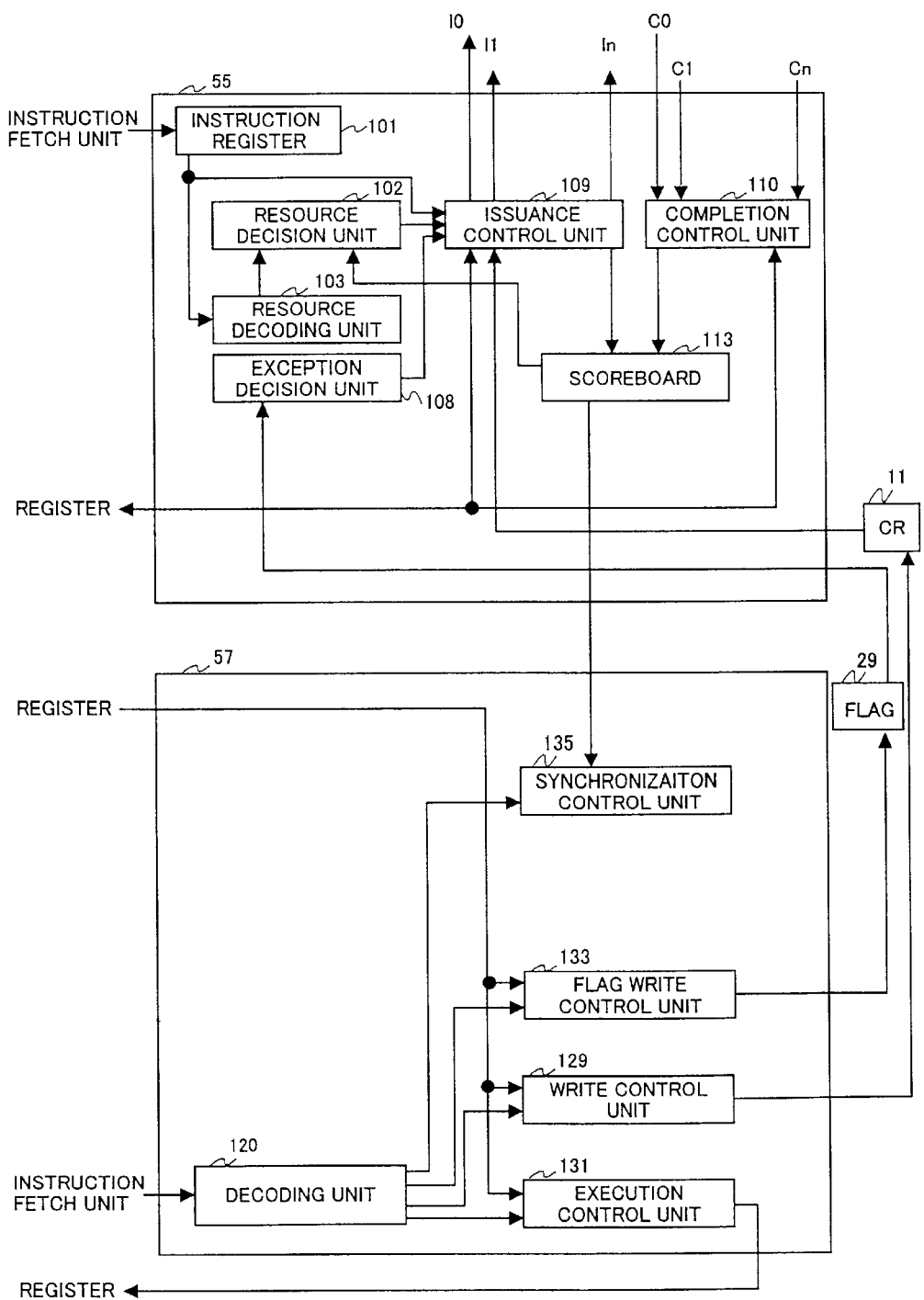
FIG. 17 shows the structures of a coprocessor instruction control unit and an instruction execution unit of the processor system shown in FIG. 16.

FIG. 17 shows the structures of the coprocessor instruction control unit 55 and the instruction execution unit 57 of the processor process shown in FIG. 16. The coprocessor instruction control unit 55 and the instruction execution unit 57 have the same structures respectively as the coprocessor instruction control unit 45 and the instruction execution unit 47 shown in FIG. 14, except that the coprocessor instruction control unit 55 comprises the exception decision unit 108 connected to the flag 29, and that the instruction execution unit 47 comprises the flag write control unit 133 that is connected to a decoding unit 120 and the register 26 and controls writing in the flag 29.

Accordingly, the processor system of the fifth embodiment has both functions of the processor system of the second embodiment and the processor system of the fourth embodiment. More specifically, if the flag 29 is "0" when a supplied coprocessor instruction is issued, the issuance control unit 109 of the coprocessor instruction control unit 55 operates as follows. In a case where the coprocessor instruction supplied from the instruction fetch unit 54 has data dependency on a preceding coprocessor instruction to be executed, the issuance control unit 109 of the coprocessor instruction control unit 55 issues the coprocessor instruction as the issuance signal In to a coprocessor designated by the CR 11, and then writes the issuance information into the scoreboard 113. In a case where the supplied coprocessor instruction has data dependency on the preceding coprocessor instruction, the issuance control unit 109 of the coprocessor instruction control unit 55 waits for the completion of the execution of the preceding coprocessor instruction. After that, the issuance control unit 109 issues the supplied coprocessor instruction as the issuance signal In to a coprocessor designated by the CR 11, and writes the issuance information into the scoreboard 113.

On the other hand, if the flag 29 is "1" at the time of issuance of a supplied coprocessor instruction, the issuance control unit 109 of the coprocessor instruction control unit 55 invariably waits for the completion of the execution of the preceding coprocessor instruction. After that, the issuance control unit 109 issues the supplied coprocessor instruction as the issuance signal In to a coprocessor designated by the CR 11, and writes the issuance information into the scoreboard 113. In a case where any of the coprocessors CPR0 to CPRn is executing a coprocessor instruction, the coprocessor instruction control unit 55 supplies the signal BUSY having the value "1" to the instruction execution unit 57. In a case where none of the coprocessors CPR0 to CPRn is executing a coprocessor instruction, the coprocessor instruction control unit 55 supplies the signal BUSY having the value "0" to the instruction execution unit 57.

If the signal BUSY having the value "0" has already been supplied from the coprocessor instruction control unit 55 at the time of reception of an instruction to wait for the completion of the execution of the preceding coprocessor instruction, the instruction execution unit 57 executes a next processor execution instruction. On the other hand, if the signal BUSY having the value "1" has already been supplied from the coprocessor instruction control unit 55 at the time of the reception of the instruction to wait, the instruction execution unit 57 waits for the completion of the execution of the preceding coprocessor instruction. When the signal BUSY turns "0", the instruction execution unit 57 executes the processor execution instruction, and ends the operation.

In the above processor system of the fifth embodiment, the main processor 51 determines the issuance timing of each coprocessor instruction in accordance with the value of the flag 29 and the signal BUSY, instead of the instruction code contained in each supplied coprocessor instruction. Thus, an efficient instruction issuance operation can be performed, regardless of the type of the coprocessor instruction supplied from the memory 53.

Sixth Embodiment

Figure 18:
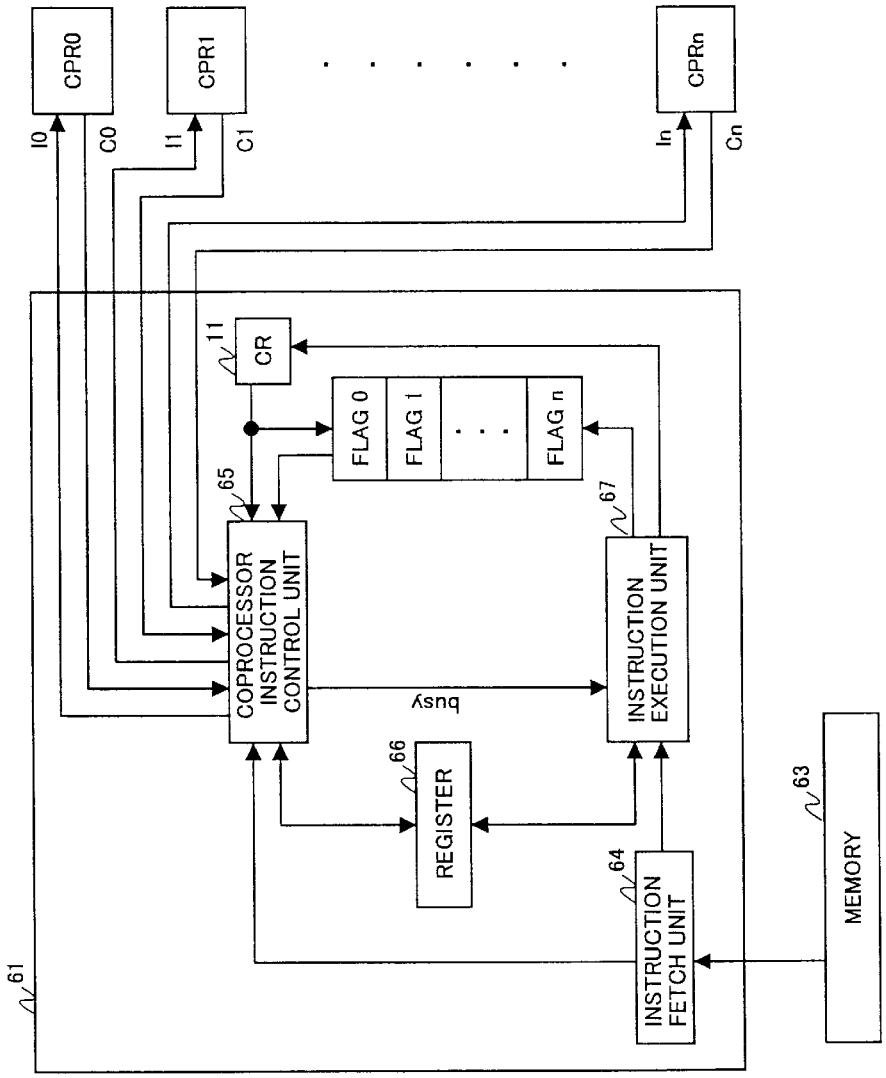
FIG. 18 shows the structure of a processor system in accordance with a sixth embodiment of the present invention.

FIG. 18 shows the structure of a processor system in accordance with a sixth embodiment of the present invention. As shown in FIG. 18, this processor system has the same structure as the processor system of the fifth embodiment shown in FIG. 16, except for the structures of an instruction fetch unit 64, a coprocessor instruction control unit 65, and an instruction execution unit 67, all of which are included in a main processor 61. The main processor 61 also includes a plurality of flags 0 to n, which are the same as the flags 0 to n in the third embodiment shown in FIG. 10.

Figure 19:
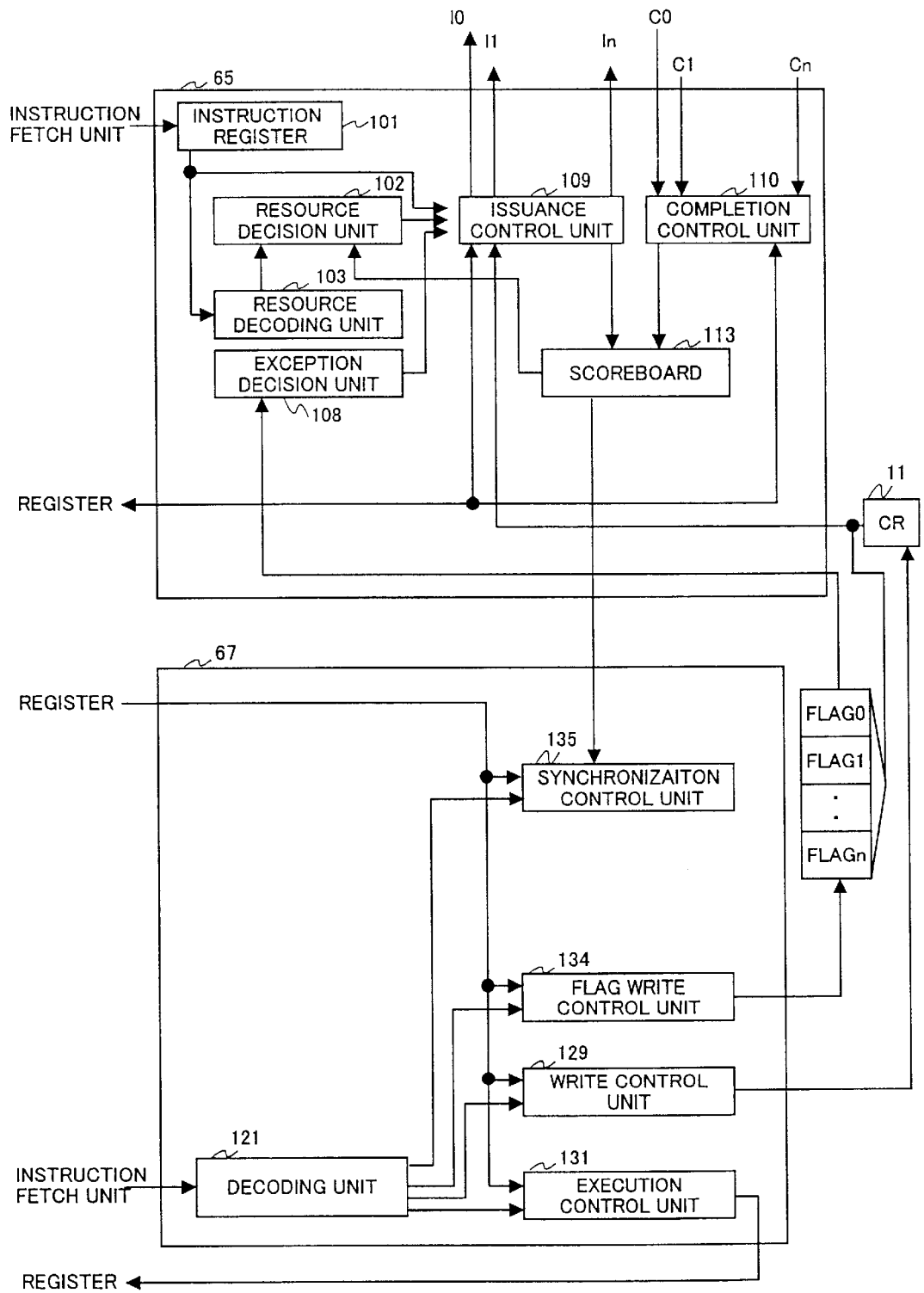
FIG. 19 shows the structures of a coprocessor instruction control unit and an instruction execution unit of the processor system shown in FIG. 18.

FIG. 19 shows the structure of the coprocessor instruction control unit 65 and the instruction execution unit 67 of the processor system shown in FIG. 18. The coprocessor instruction control unit 65 and the instruction execution unit 67 have the same structures respectively as the coprocessor instruction control unit 55 and the instruction execution unit 57, except that the coprocessor instruction control unit 65 comprises the exception decision unit 108 connected to the flags 0 to n, and that the instruction execution unit 67 includes the flag write control unit 134 that is connected to a decoding unit 121 and a register 66 and controls writing in the flags 0 to n.

Accordingly, the processor system of the sixth embodiment has both functions of the processor system of the third embodiment and the processor system of the fourth embodiment. In this processor system, the main processor 61 determines whether or not each coprocessor instruction to be executed has control dependency on a preceding coprocessor instruction with respect to each of the coprocessors CPR0 to CPRn, and each coprocessor instruction is issued without waiting for the issuance of another coprocessor instruction being executed by another coprocessor. Thus, the coprocessor instructions can be efficiently issued to the coprocessors CPR0 to CPRn.

Furthermore, the main processor 61 determines the issuance timing of each coprocessor instruction in accordance with the signal BUSY that indicates whether or not any coprocessor instruction is being executed, instead of the instruction code contained in each coprocessor instruction. Thus, an efficient instruction issuance operation can be performed, regardless of the type of each coprocessor instruction supplied from the memory 63.

Seventh Embodiment

Figure 20:
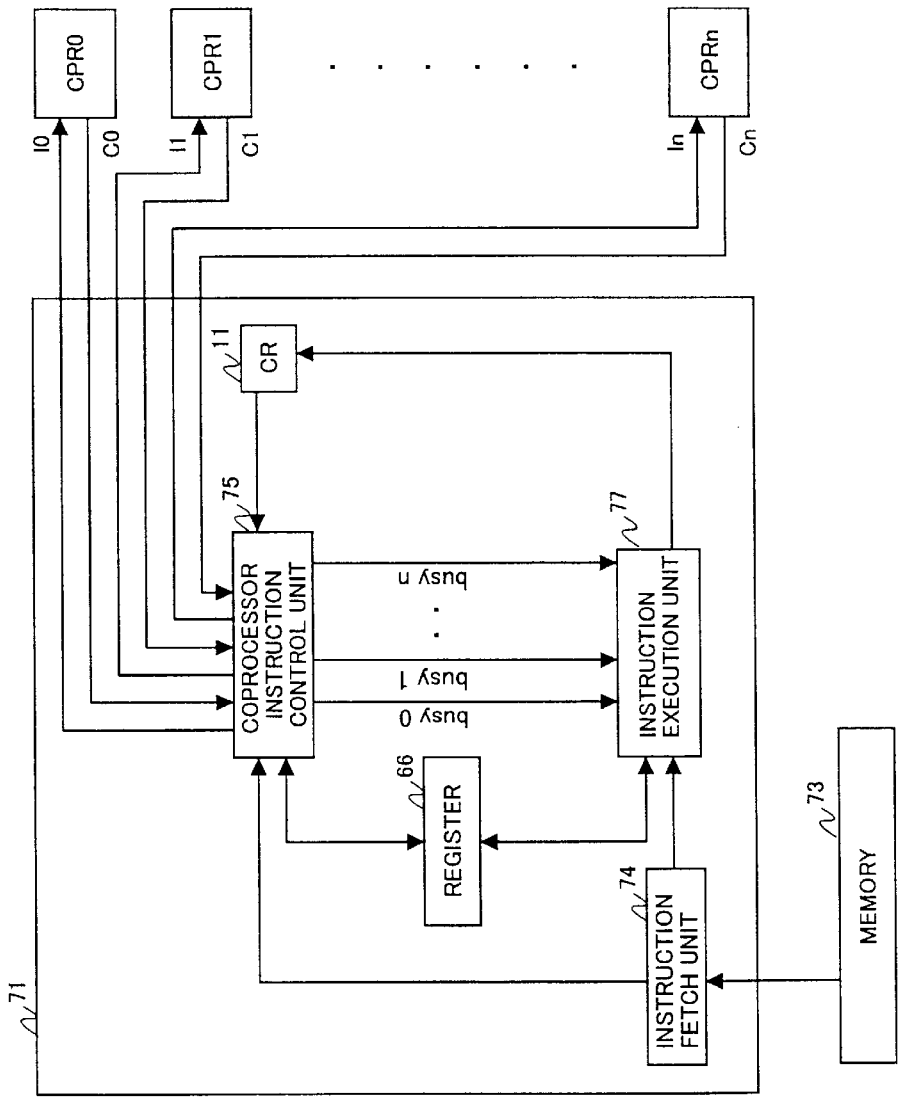
FIG. 20 shows the structure of a processor system in accordance with a seventh embodiment of the present invention.

FIG. 20 shows the structure of a processor system in accordance with a seventh embodiment of the present invention. As shown in FIG. 20, this processor system has the same structure as the processor system of the fourth embodiment shown in FIG. 13, except for the structures of an instruction fetch unit 74, a coprocessor instruction control unit 75, and an instruction execution unit 77, all of which are contained in a main processor 71.

Figure 21:
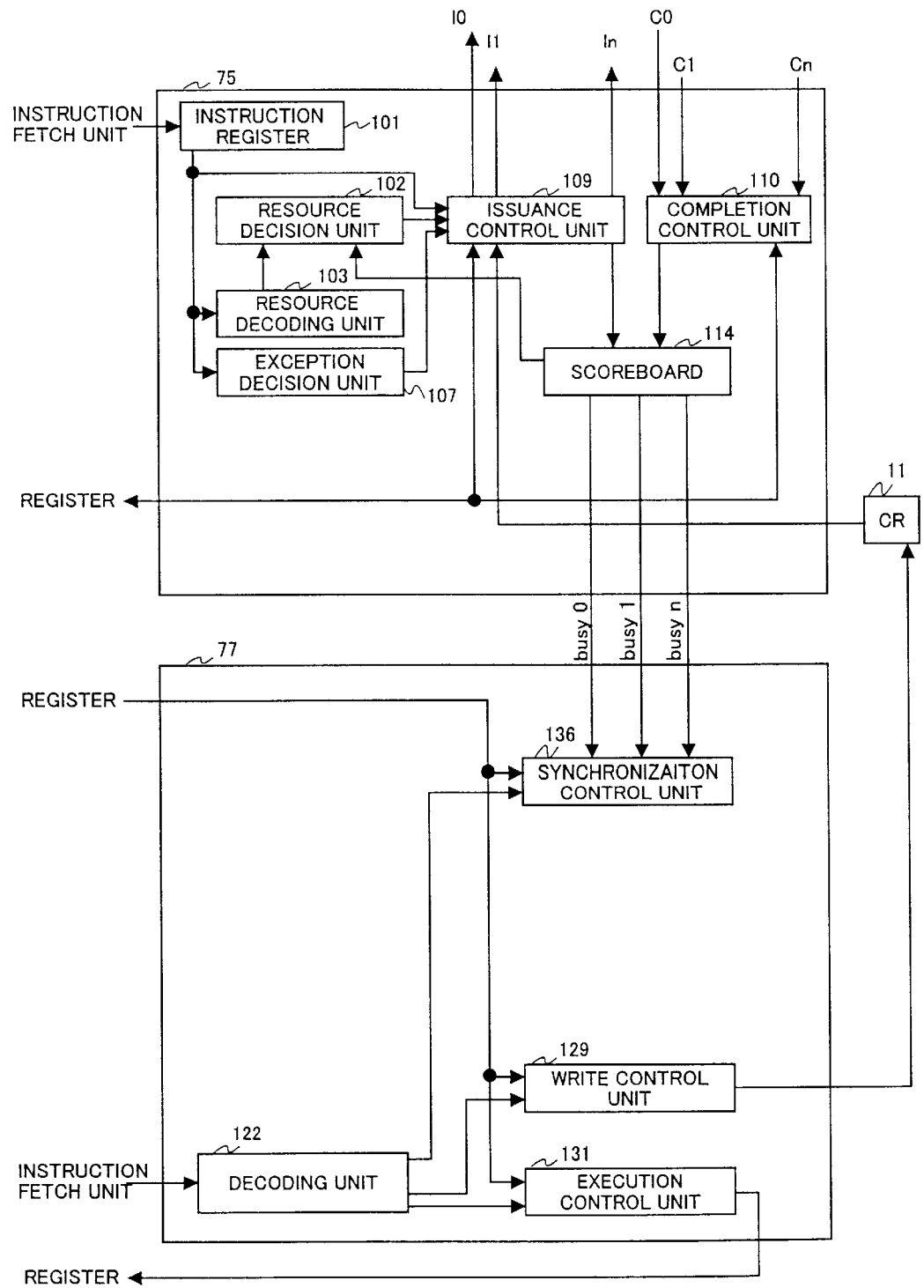
FIG. 21 shows the structures of a coprocessor instruction control unit and an instruction execution unit of the processor system shown in FIG. 20.

FIG. 21 shows the structures of the coprocessor instruction control unit 75 and the instruction execution unit 77 of the processor system shown in FIG. 20. The coprocessor instruction control unit 75 and the instruction execution unit 77 have the same structures respectively as the coprocessor instruction control unit 45 and the instruction execution unit 47 shown in FIG. 14, except that the coprocessor instruction control unit 75 includes a scoreboard 114 which outputs a signal BUSYn (n is an integer of 0 or greater) corresponding to each of the coprocessors CPR0 to CPRn, and that the instruction execution unit 77 includes a synchronization control unit 136 to which a decoding unit 122 and the register 9 are connected and the signal BUSYn is supplied.

In the following, the different aspects from the processor system of the fourth embodiment shown in FIG. 13 will be described in greater detail.

Figure 23:
FIG. 23 shows a format of an instruction to wait until the execution of a coprocessor instruction being currently executed is completed.

First, an instruction to wait for the completion of the execution of a preceding coprocessor instruction being executed by a designated coprocessor is stored in advance in a memory 73 of this embodiment. This instruction has a format shown in FIG. 23. In the operand in the instruction format shown in FIG. 23, information that designates a coprocessor for the execution of the preceding coprocessor instruction.

When the instruction fetch unit 74 fetches the instruction to wait for the completion of the execution of the preceding coprocessor instruction being executed by the designated coprocessor, the fetched instruction is supplied to the instruction execution unit 77. If the value of the signal BUSYn (n is an integer of 0 or greater) supplied from the coprocessor instruction control unit 75 corresponding to the designated coprocessor CPRn is "0", the synchronization control unit 136 of the instruction execution unit 77 executes a processor execution instruction. If the value of the signal BUSYn supplied from the coprocessor instruction control unit 75 with respect to the designated coprocessor CPRn is "1", the synchronization control unit 136 waits for the completion of the execution of the preceding coprocessor instruction. After that, when the signal BUSYn turns "0", the synchronization control unit 136 executes the processor execution instruction and ends the operation.

In a case where the designated coprocessor CPRn is executing a coprocessor instruction, the scoreboard 114 in the coprocessor instruction control unit 75 supplies the signal BUSYn having the value "1" to et synchronization control unit 136. In a case where the designated coprocessor CPRn is executing a coprocessor instruction, the scoreboard 114 supplies the signal BUSYn having the value "0" to the synchronization control unit 136 of the instruction execution unit 77.

By the above processor system of the seventh embodiment, the same effects as obtained by the processor system of the fourth embodiment can be obtained. Furthermore, the main processor 71 determines whether or not any of the coprocessors CPR0 to CPRn is executing a coprocessor instruction, so that the coprocessor instruction can be issued to a designated coprocessor without waiting for the issuance of a coprocessor instruction to be executed by another coprocessor. Thus, the issuance of coprocessor instructions to the coprocessors CPR0 to CPRn can be efficiently carried out.

In the processor system of the seventh embodiment, a coprocessor instruction having the field EXCEP affixed to the operand as in the first embodiment may be stored in advance in the memory 73. More specifically, if the field EXCEP in a supplied coprocessor instruction is "0", the issuance control unit 109 of the coprocessor instruction control unit 75 operates as follows. In a case where the coprocessor instruction supplied from the instruction fetch unit 74 has no data dependency on a preceding coprocessor instruction to be executed, the issuance control unit 109 issues the supplied coprocessor instruction as the issuance signal In to a coprocessor designated by the CR 11, and then writes the issuance information into the scoreboard 114. On the other hand, in a case where the coprocessor instruction supplied from the instruction fetch unit 74 has data dependency on the preceding coprocessor instruction to be executed, the issuance control unit 109 waits for the completion of the execution of the preceding coprocessor instruction. After that, the issuance control unit 109 issues the supplied coprocessor instruction as the issuance signal In to the coprocessor designated by the CR 11, and writes the issuance information into the scoreboard 114.

If the field EXCEP in the supplied coprocessor instruction is "1", the issuance control unit 109 invariably waits for the completion of the execution of the preceding coprocessor instruction. After that, the issuance control unit 109 issues the supplied coprocessor instruction as the issuance signal In to the coprocessor designated by the CR 11, and writes the issuance information into the scoreboard 114.

In the processor system having the above structure, the main processor 71 determines the issuance timing of each coprocessor instruction in accordance with the information written in the field EXCEP coupled with the operand, instead of the instruction code contained in each supplied coprocessor instruction. Thus, a more efficient instruction issuance operation can be performed, regardless of the type of a coprocessor instruction supplied from the memory 73.

Figure 22:
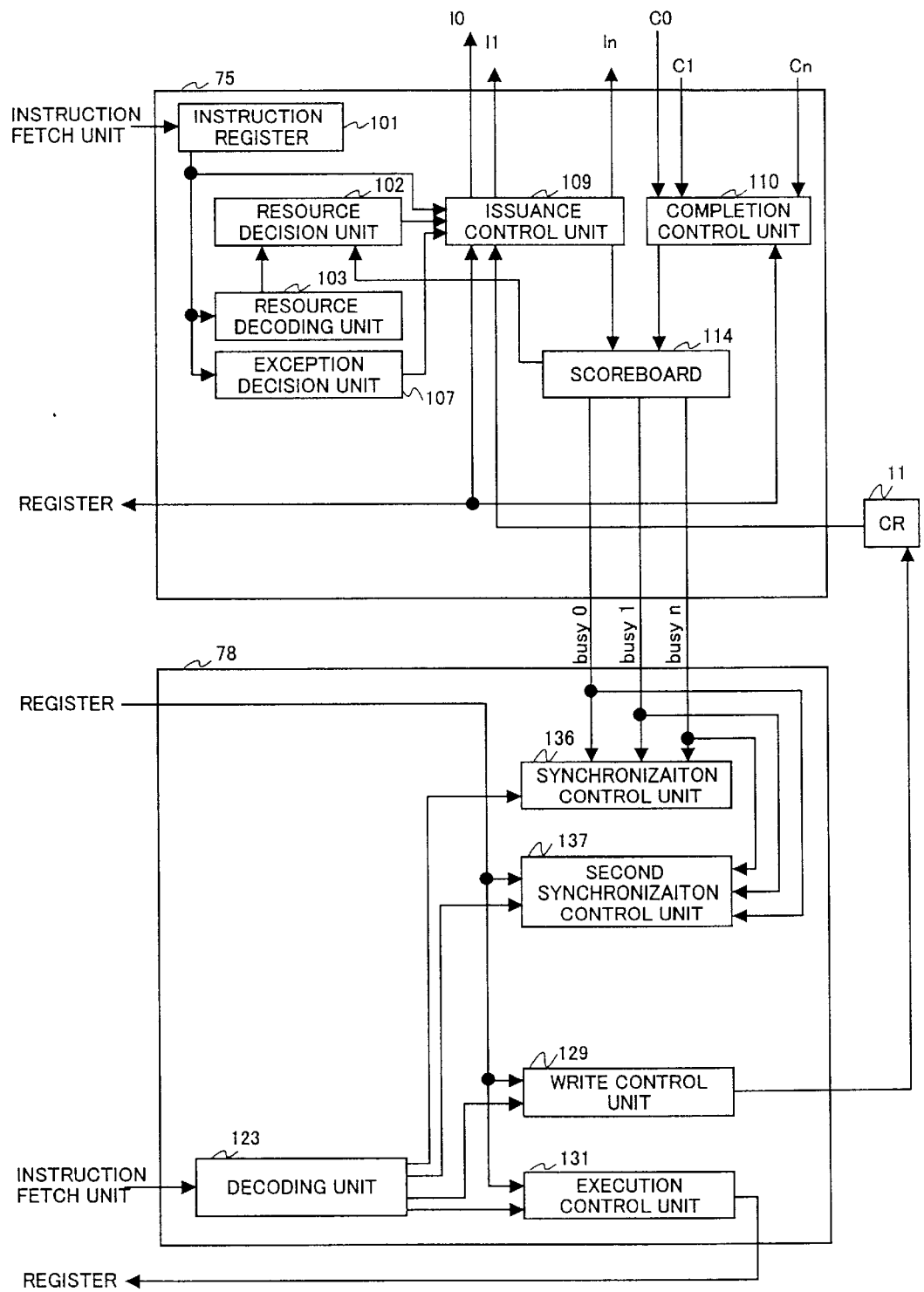
FIG. 22 shows a modification of the coprocessor instruction control unit and the instruction execution unit of the processor system shown in FIG. 20.

In this embodiment, the instruction execution unit may execute a processor execution instruction only after n of signals BUSYn all become "0". FIG. 22 shows the structure of such a modification of the instruction execution unit of this embodiment. As shown in FIG. 22, the instruction execution unit 78 further comprises a second synchronization control unit 137 to which a decoding unit 123 and the register 66 are connected, and the n of signals BUSYn are supplied. When the n of signals BUSYn all become "0", the second synchronization control unit 137 executes a processor execution instruction, and then completes the operation.

Eighth Embodiment

Figure 24:
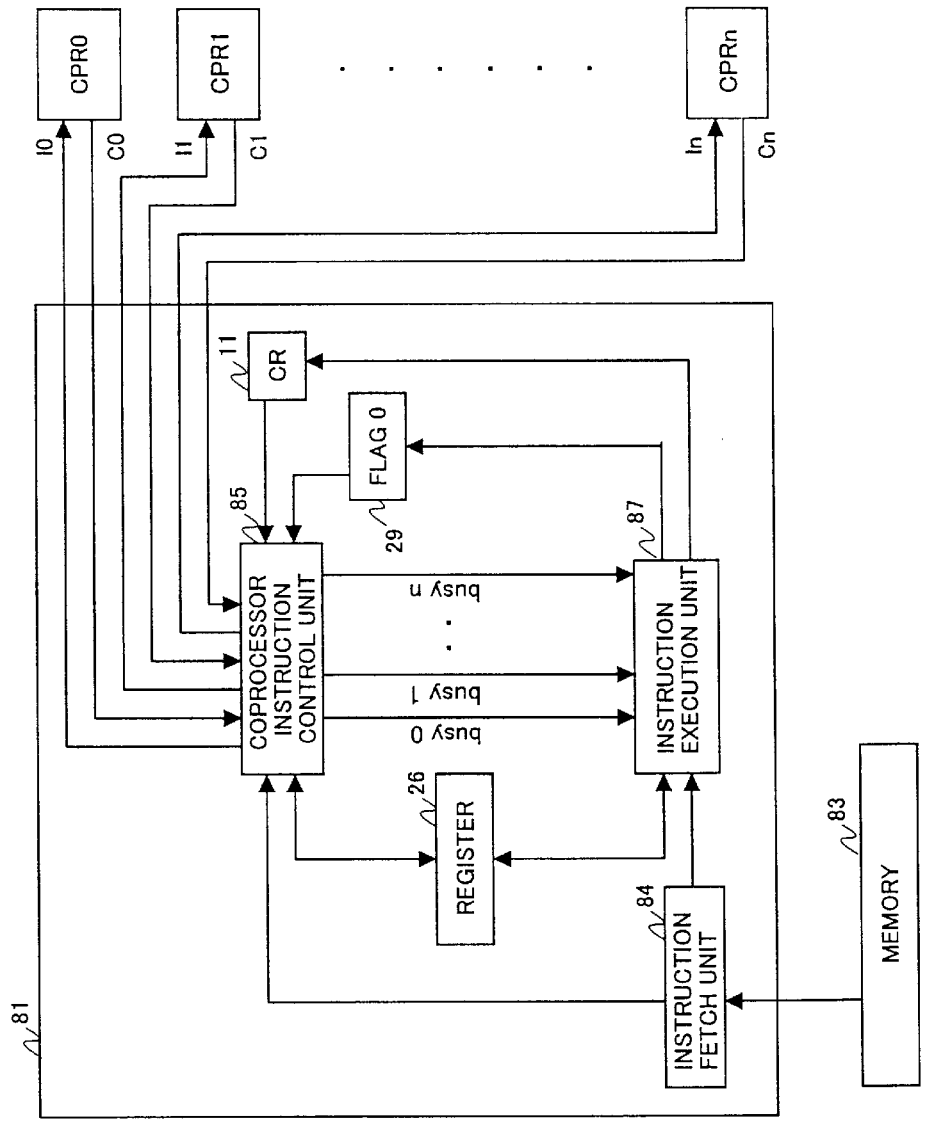
FIG. 24 shows the structure of a processor system in accordance with an eighth embodiment of the present invention.

FIG. 24 shows the structure of a processor system in accordance with an eighth embodiment of the present invention. As shown in FIG. 24, this processor system has the same structure as the processor system of the seventh embodiment shown in FIG. 20, except for the structures of an instruction fetch unit 84, a coprocessor instruction control unit 85, and an instruction execution unit 87, all of which are included in a main processor 81. The main processor 81 also includes the flag 29, which is the same as the flag 29 in the second embodiment shown in FIG. 8.

Figure 25:
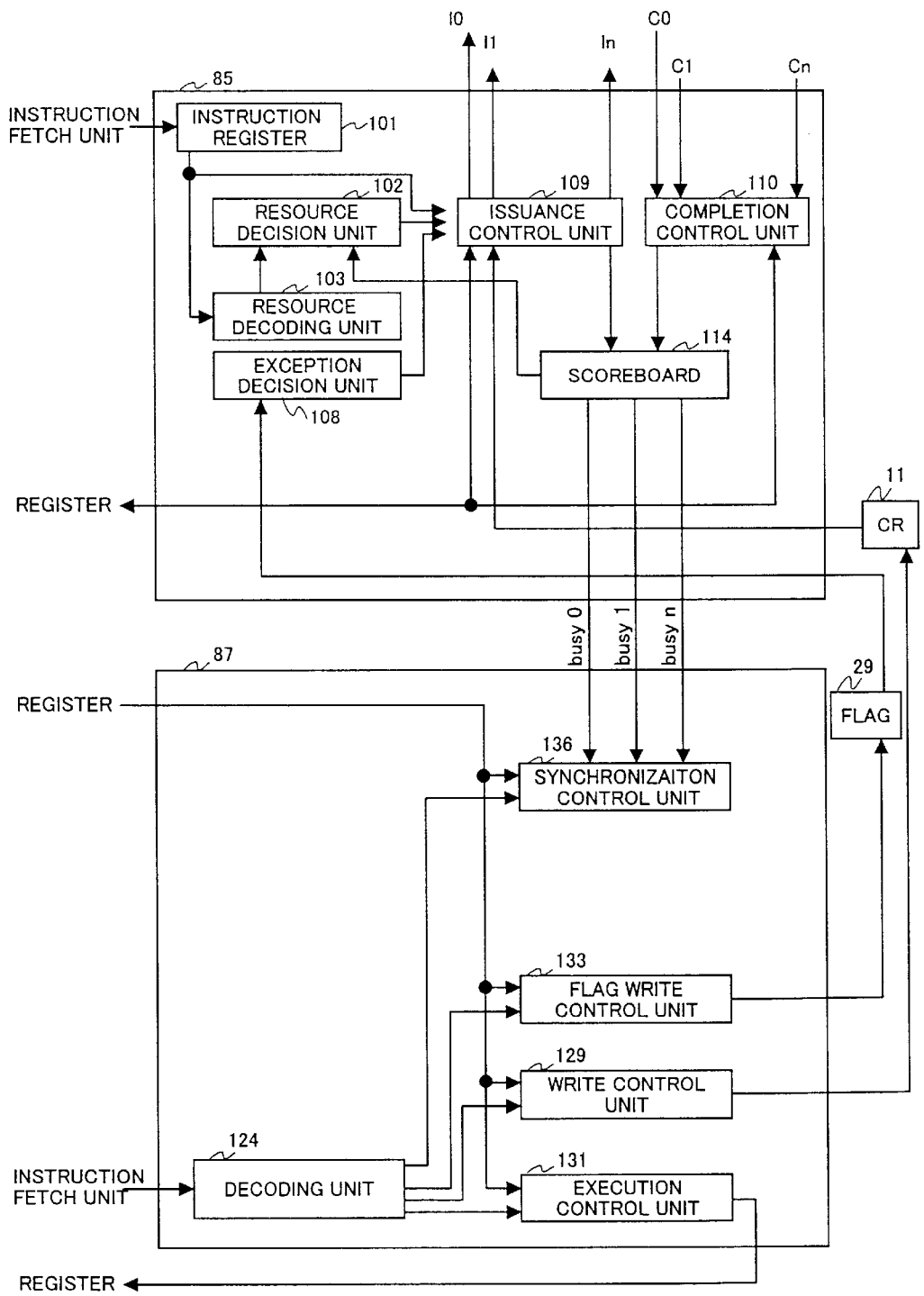
FIG. 25 shows the structures of a coprocessor instruction control unit and an instruction execution unit of the processor system shown in FIG. 24.

FIG. 25 shows the structures of a coprocessor instruction control unit 85 and an instruction execution unit 87 of the processor system shown in FIG. 24. The coprocessor instruction control unit 85 and the instruction execution unit 87 have the same structures respectively as the coprocessor instruction control unit 75 and the instruction execution unit 77 shown in FIG. 21, except that the coprocessor instruction control unit 85 includes the exception decision unit 108 connected to the flag 29, and that the instruction execution unit 87 further includes the flag write control unit 133 that is connected to a decoding unit 124 and the register 26 and controls writing in the flag 29.

Accordingly, the processor system of the eighth embodiment has both functions of the processor system of the seventh embodiment and the processor system of the second embodiment.

By the processor system of the eighth embodiment, the same effects as obtained by the processor system of the seventh embodiment can be obtained. Also, the main processor 81 determines the issuance timing of each coprocessor instruction in accordance with the value of the flag 29, instead of the instruction code contained in each supplied coprocessor instruction. Thus, an efficient instruction issuance operation can be performed, regardless of the type of a coprocessor instruction supplied from the memory 83.

In the processor system of the eight embodiment, the instruction to wait for the completion of the execution of a preceding coprocessor instruction described in the fourth embodiment may be stored in advance in a memory 83, so that the instruction to wait can also be performed as in the processor system of the fourth embodiment. In the processor system having such a structure, the main processor 81 executes a processor execution instruction and determines the issuance timing of each coprocessor instruction in accordance with the signal BUSY, instead of the instruction code contained in each supplied coprocessor instruction. As described before, the signal BUSY indicates whether or not at least one coprocessor is currently executing a coprocessor instruction. Accordingly, with the processor system of this embodiment, a more efficient instruction issuance operation can be performed in accordance with the type of each coprocessor instruction supplied from the memory 83.

Figure 26:
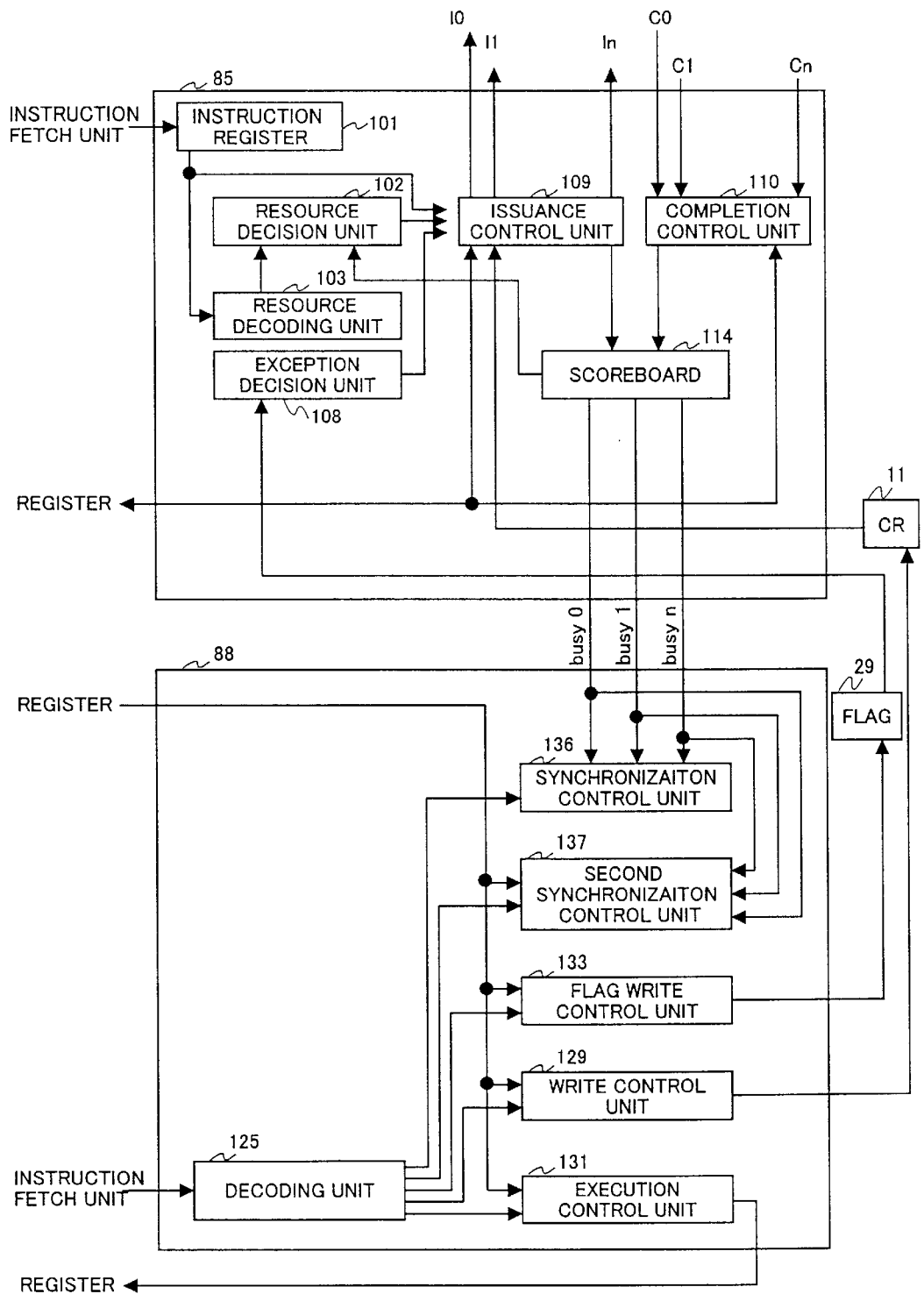
FIG. 26 shows a modification of the coprocessor instruction control unit and the instruction execution unit of the processor system shown in FIG. 24.

Additionally, the instruction execution unit of this embodiment may execute a processor execution instruction and complete the operation, only after the signals BUSYn all become "0". FIG. 26 shows the structure of such a modification of the instruction execution unit of this embodiment. As shown in FIG. 26, the instruction execution unit 88 further comprises the second synchronization control unit 137 to which a decoding unit 125 and the register 26 are connected, and the n of signals BUSYn are supplied. The second synchronization control unit executes a processor execution instruction and completes the operation, only after the n of signals BUSYn all become "0".

Ninth Embodiment

Figure 27:
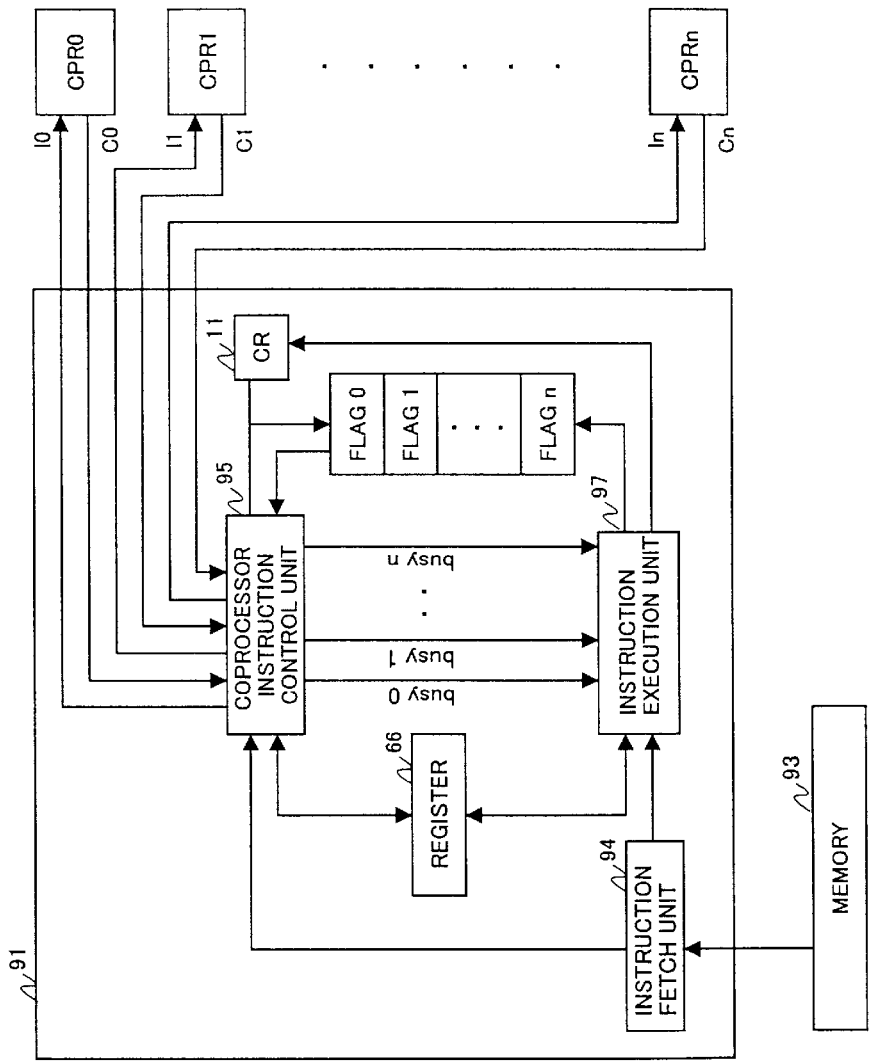
FIG. 27 shows the structure of a processor system in accordance with a ninth embodiment of the present invention.

FIG. 27 shows the structure of a processor system in accordance with a ninth embodiment of the present invention. As shown in FIG. 27, this processor system has the same structure as the processor system of the eighth embodiment shown in FIG. 24, except for the structures of an instruction fetch unit 94, a coprocessor instruction control unit 95, an instruction execution unit 97, and the register 66, all of which are included in a main processor 91. The main processor 91 also includes the plurality of flags 0 to n, which are the same as the flags 0 to n in the third embodiment shown in FIG. 10.

Figure 28:
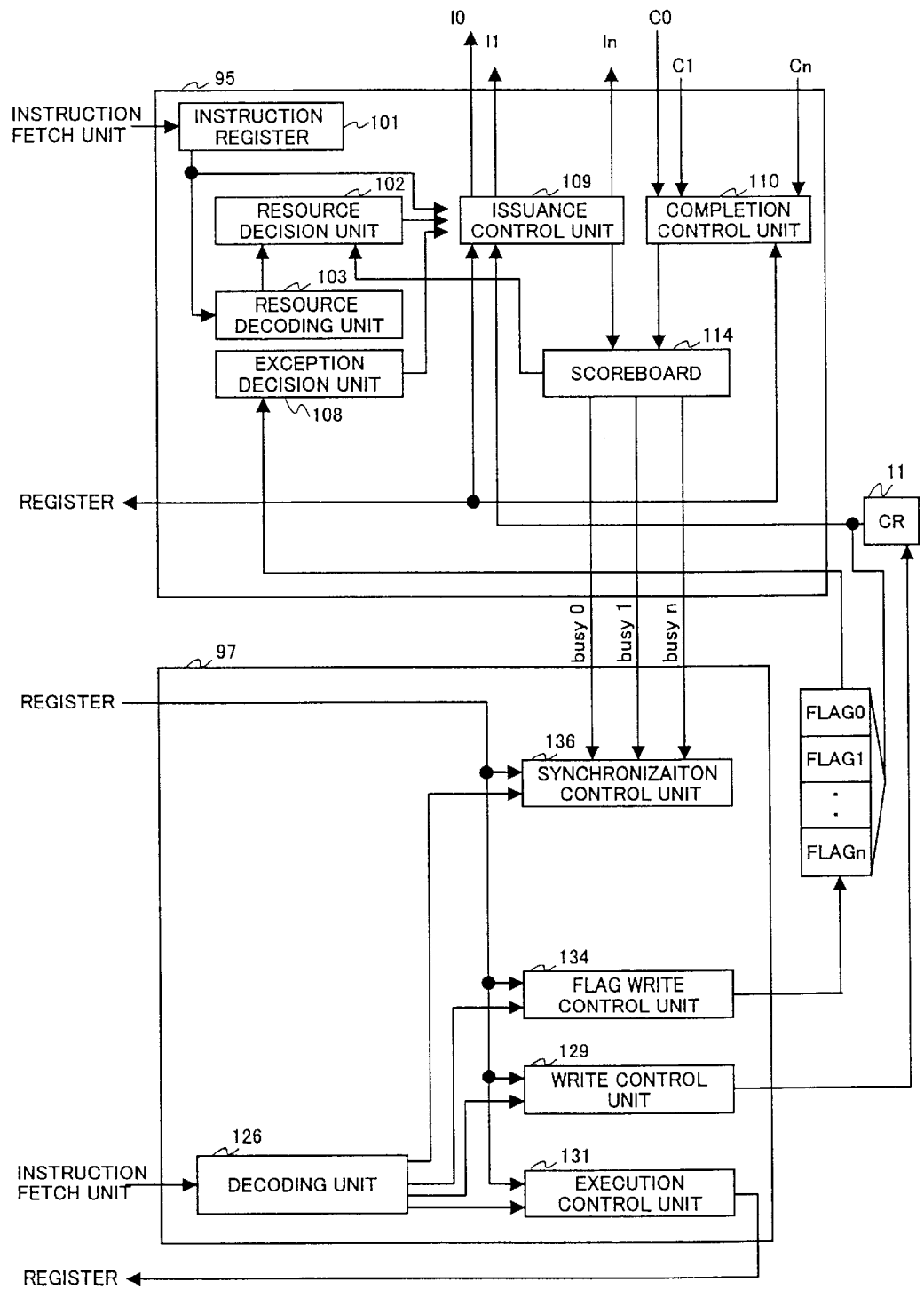
FIG. 28 shows the structures of a coprocessor instruction control unit and an instruction execution unit of the processor system shown in FIG. 27.

FIG. 28 shows the structures of the coprocessor instruction control unit 95 and the instruction execution unit 97 of the processor system shown in FIG. 27. The coprocessor instruction control unit 95 and the instruction execution unit 97 have the same structures respectively as the coprocessor instruction control unit 85 and the instruction execution unit 87, except that the coprocessor instruction control unit 95 includes the exception decision unit 108 connected to the flags 0 to n, and that the instruction execution unit 97 includes the flag write control unit 134 that is connected to a decoding unit 126 and the register 66 and controls writing in the flags 0 to n.

Accordingly, the processor system of the ninth embodiment of the present invention has both functions of the processor system of the third embodiment and the processor system of the seventh embodiment. In this processor system, the main processor 91 determines whether or not each coprocessor instruction has control dependency with respect to each of the coprocessors CPR0 to CPRn, and issues each coprocessor instruction without waiting for the issuance of another coprocessor instruction. Thus, the coprocessor instructions can be efficiently issued to the coprocessors CPR0 to CPRn.

Also, the main processor 91 determines the issuance timing of each coprocessor instruction with respect to each coprocessor in accordance with the signal BUSYn, instead of the instruction code contained in each supplied coprocessor instruction. Thus, an efficient instruction issuance operation can be performed, regardless of the type of each coprocessor instruction supplied from a memory 93.

In the processor system of the ninth embodiment, an instruction to wait for the completion of the execution of each coprocessor instruction may be stored in advance in the memory 93 as in the fourth embodiment, so that the processor system of this embodiment can execute that instruction as in the fourth embodiment. In this processor system, the main processor 91 executes a processor execution instruction and determines the issuance timing of each coprocessor instruction, in accordance with the signals BUSYn, instead of the instruction code contained in each supplied coprocessor instruction. Thus, a more efficient instruction issuance operation can be performed, regardless of the type of each coprocessor instruction supplied from the memory 93.

Figure 29:
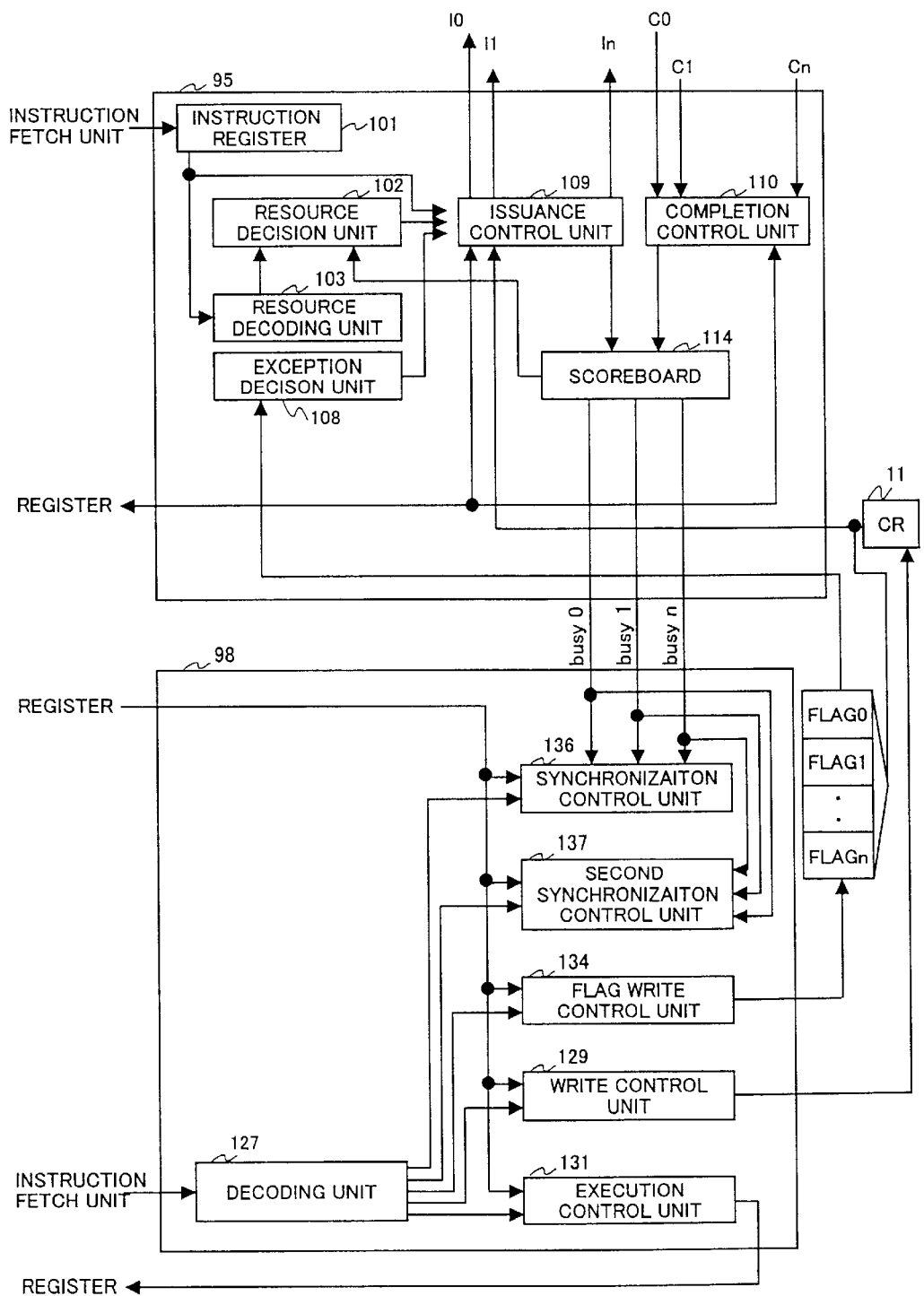
FIG. 29 shows a modification of the coprocessor instruction control unit and the instruction execution unit of the processor system shown in FIG. 27.

Additionally, in this embodiment, the instruction execution unit may execute a processor execution instruction and completes the operation, only when all the signals BUSYn become "0". FIG. 29 shows the structure of a modification of the instruction execution unit of this embodiment. As shown in FIG. 29, the instruction execution unit 98 further comprises the second synchronization control unit 137 to which a decoding unit 127 and the register 66 are connected and the signals BUSYn are supplied. The second synchronization control unit 137 executes a processor execution instruction and completes the operation, only when all the signals BUSYn become "0".

The present invention is not limited to the specifically disclosed embodiments, but variations and modifications may be made without departing from the scope of the present invention.

The present application is based on Japanese priority application No. 11-294580, filed on Oct. 15, 1999, the entire contents of which are hereby incorporated by reference.

What is claimed is:

1. A processor connected to a coprocessor, comprising:
   a determination unit that determines whether a first coprocessor instruction to be executed by the coprocessor has a possibility of having control dependency on a second coprocessor instruction to be executed by the coprocessor before the first coprocessor instruction, in accordance with dependency possibility data corresponding to the first coprocessor instruction; and
   an issuance unit that issues the first coprocessor instruction to the coprocessor after the execution of the second coprocessor instruction is completed, when the first coprocessor instruction has the possibility of having the control dependency on the second coprocessor instruction,
   wherein the dependency possibility data is coupled with the first coprocessor instruction, and includes a field that indicates whether the first coprocessor instruction has the possibility of having the control dependency.

2. The processor as claimed in claim 1, wherein the dependency possibility data is stored in a flag that can be rewritten by a supplied signal.

3. The processor as claimed in claim 2, wherein the dependency possibility data stored in the flag indicates whether the first coprocessor instruction has the possibility of having the control dependency on the second coprocessor instruction.

4. The processor as claimed in claim 2, wherein the processor is connected to at least two coprocessors, and the flag is employed for each of the coprocessors.

5. A processor connected to a coprocessor, comprising:
   a signal generator unit that generates a signal for indicating whether the coprocessor is executing a first coprocessor instruction; and
   an instruction execution unit that executes a processor execution instruction when the signal generated from the signal generator unit indicates that the coprocessor is executing the first coprocessor instruction,
   further comprising:
      a flag that can be rewritten by a supplied signal; and
      an instruction issuance unit that issues a next coprocessor instruction to the coprocessor after execution of a preceding coprocessor instruction being executed by the coprocessor is completed, where the flag has a predetermined value.

6. The processor as claimed in claim 5, wherein:
   said processor is connected to at least two coprocessors;
   the signal generator unit generates signals, each of which indicates whether each corresponding one of the coprocessors is executing a coprocessor instruction; and
   the instruction execution unit executes a processor execution instruction only after receiving a signal from the signal generator unit indicating that execution by a designated one of the coprocessors is completed, where the signal indicating that the designated one of the coprocessors is executing an instruction has been generated from the signal generator unit.

7. The processor as claimed in claim 6, wherein, when the signal generated from the signal generator unit indicates that at least one of the coprocessors is executing a coprocessor instruction, the instruction execution unit executes the processor execution instruction only after receiving a signal that indicates completion of execution by all the coprocessors.

8. The processor as claimed in claim 6, further comprising:
   a flag that can be rewritten by a supplied signal; and
   an instruction issuance unit that issues a next coprocessor instruction to a designated one of the processors after execution of a preceding coprocessor instruction being executed by the designated one of the processors is completed, where the flag has a predetermined value.

9. A processor system comprising:
   a coprocessor; and
   a main processor connected to the coprocessor, which main processor determines whether a first coprocessor instruction to be executed by the coprocessor has a possibility of having control dependency on a second coprocessor instruction to be executed by the coprocessor before the first coprocessor instruction, in accordance with dependency possibility data corresponding to the first coprocessor instruction,
   wherein, when the first coprocessor instruction has the possibility of having the control dependency on the second coprocessor instruction, the main processor issues the first coprocessor instruction to the coprocessor after the execution of the second coprocessor instruction is completed,
   wherein the dependency possibility data is coupled with the first coprocessor instruction, and includes a field that indicates whether the first coprocessor instruction has the possibility of having the control dependency.

10. The processor system as claimed in claim 9, wherein the dependency possibility data is stored in a flag that can be rewritten by a supplied signal.

11. The processor system as claimed in claim 10, wherein the dependency possibility data stored in the flag indicates whether the first coprocessor instruction has the possibility of having the control dependency on the second coprocessor instruction.

12. The processor system as claimed in claim 10, further comprising at least one more coprocessor, wherein the flag is employed for each of the coprocessors.

13. A processor system comprising:
   a coprocessor; and
   a main processor connected to the coprocessor,
   wherein the main processor includes:
      a signal generator unit that generates a signal for indicating whether the coprocessor is executing a first coprocessor instruction; and
      an instruction execution unit that executes a processor execution instruction when the signal generated from the signal generator unit indicates that the coprocessor is executing the first coprocessor instruction, further comprising:
a flag that can be rewritten by a supplied signal; and
an instruction issuance unit that issues a next coprocessor instruction to the coprocessor after execution of a preceding coprocessor instruction being executed by the coprocessor is completed, where the flag has a predetermined value.

14. The processor system as claimed in claim 13, further comprising at least one more coprocessor,
wherein the signal generator unit generates signals, each of which indicates whether each corresponding one of the coprocessors is executing a coprocessor instruction; and
the instruction execution unit executes a processor execution instruction only after receiving a signal from the signal generator unit indicating that execution by a designated one of the coprocessors is completed, where the signal indicating that the designated one of the coprocessors is executing an instruction has been generated from the signal generator unit.

15. The processor system as claimed in claim 14, wherein, when the signal generated from the signal generator unit indicates that at least one of the coprocessors is executing a coprocessor instruction, the instruction execution unit executes the processor execution instruction only after receiving a signal that indicates completion of execution by all the coprocessors.

16. The processor system as claimed in claim 14, further comprising:
a flag that can be rewritten by a supplied signal; and
an instruction issuance unit that issues a next coprocessor instruction to a designated one of the processors after execution of a preceding coprocessor instruction being executed by the designated one of the processors is completed, where the flag has a predetermined value.

17. A processor connected to a coprocessor, comprising:
a signal generator unit that generates a signal for indicating whether the coprocessor is executing a first coprocessor instruction; and
an instruction execution unit that executes a processor execution instruction when the signal generated from the signal generator unit indicates that the coprocessor is executing the first coprocessor instruction,
wherein:
said processor is connected to at least two coprocessors;
the signal generator unit generates signals, each of which indicates whether each corresponding one of the coprocessors is executing a coprocessor instruction; and
the instruction execution unit executes a processor execution instruction only after receiving a signal from the signal generator unit indicating that execution by a designated one of the coprocessors is completed, where the signal indicating that the designated one of the coprocessors is executing an instruction has been generated from the signal generator unit, and
wherein, when the signal generated from the signal generator unit indicates that at least one of the coprocessors is executing a coprocessor instruction, the instruction execution unit executes the processor execution instruction only after receiving a signal that indicates completion of execution by all the coprocessors.

18. A processor system comprising:
a coprocessor; and
a main processor connected to the coprocessor,
wherein the main processor includes:
a signal generator unit that generates a signal for indicating whether the coprocessor is executing a first coprocessor instruction; and
an instruction execution unit that executes a processor execution instruction when the signal generated from the signal generator unit indicates that the coprocessor is executing the first coprocessor instruction,
at least one more coprocessor,
wherein the signal generator unit generates signals, each of which indicates whether each corresponding one of the coprocessors is executing a coprocessor instruction; and
the instruction execution unit executes a processor execution instruction only after receiving a signal from the signal generator unit indicating that execution by a designated one of the coprocessors is completed, where the signal indicating that the designated one of the coprocessors is executing an instruction has been generated from the signal generator unit, and
wherein, when the signal generated from the signal generator unit indicates that at least one of the coprocessors is executing a coprocessor instruction, the instruction execution unit executes the processor execution instruction only after receiving a signal that indicates completion of execution by all the coprocessors.

* * * * *

UNITED STATES PATENT AND TRADEMARK OFFICE
CERTIFICATE OF CORRECTION

PATENT NO. : 6,775,762 B1
DATED : August 10, 2004
INVENTOR(S) : Hideo Miyake et al.

It is certified that error appears in the above-identified patent and that said Letters Patent is hereby corrected as shown below:

Column 18,
Line 25, insert -- , -- after "system"

Signed and Sealed this

Twenty-sixth Day of April, 2005

JON W. DUDAS
*Director of the United States Patent and Trademark Office*